(12) United States Patent
Danielsen et al.

(10) Patent No.: US 10,502,181 B2
(45) Date of Patent: Dec. 10, 2019

(54) BONDED WINDOW COVER WITH JOINT ASSEMBLY FOR A WIND TURBINE ROTOR BLADE

(71) Applicant: General Electric Company, Schenectady, NY (US)

(72) Inventors: Darren John Danielsen, Simpsonville, SC (US); Austin Erdenberger, Sanger, TX (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 15/629,895

(22) Filed: Jun. 22, 2017

(65) Prior Publication Data

US 2018/0372068 A1  Dec. 27, 2018

(51) Int. Cl.
| | | |
|---|---|---|
| F03D 1/00 | (2006.01) | |
| F03D 1/06 | (2006.01) | |
| F03D 13/10 | (2016.01) | |

(52) U.S. Cl.
CPC .......... *F03D 1/0683* (2013.01); *F03D 1/0641* (2013.01); *F03D 1/0675* (2013.01); *F03D 13/10* (2016.05); *F05B 2230/80* (2013.01); *F05B 2240/302* (2013.01)

(58) Field of Classification Search
CPC .... F03D 1/0683; F03D 1/0641; F03D 1/0675; F03D 13/10; F05B 2240/302; F05B 2230/80
See application file for complete search history.

(56) References Cited

U.S. PATENT DOCUMENTS

| | | | | |
|---|---|---|---|---|
| 8,128,364 B2* | 3/2012 | Pesetsky | ............... | F03D 1/0675 |
| | | | | 415/4.3 |
| 8,246,311 B2* | 8/2012 | Pesetsky | ................... | F03D 1/06 |
| | | | | 416/231 R |
| 8,764,401 B2* | 7/2014 | Hayden | ................. | F03D 1/0675 |
| | | | | 416/213 R |
| 8,898,901 B2* | 12/2014 | Richter | ................. | B29C 65/505 |
| | | | | 29/889.71 |
| 9,297,357 B2 | 3/2016 | Busbey et al. | | |
| 2011/0142667 A1* | 6/2011 | Miebach | ............... | F03D 1/0675 |
| | | | | 416/229 R |
| 2014/0169978 A1* | 6/2014 | Livingston | ............ | F03D 1/0675 |
| | | | | 416/226 |

(Continued)

OTHER PUBLICATIONS

Extended European Search Report and Opinion issued in connection with corresponding EP Application No. 18178758.1 dated Oct. 31, 2018.

*Primary Examiner* — Hieu T Vo
*Assistant Examiner* — Sherman D Manley
(74) *Attorney, Agent, or Firm* — Dority & Manning, P.A.

(57) ABSTRACT

A bonded window cover for an access window of a rotor blade assembly having a unique joint assembly is provided. For example, for rotor blade assembly having blade inserts that form access windows with the rotor blade segments, the laminated in window covers are replaced with bonded windows. More specifically, the bonded-in window covers are bonded in with a window frame lap joint, which allows the transition from two sets of inner skin layers (bonded onto one another) to one set of inner skin layers. Without this transition, the leading edge would have an undesirable bump or protrusion as well as waves in the skin layers.

19 Claims, 31 Drawing Sheets

(56) References Cited

U.S. PATENT DOCUMENTS

| | | | |
|---|---|---|---|
| 2014/0301855 A1* | 10/2014 | Busbey | F03D 1/0641 |
| | | | 416/223 R |
| 2015/0064014 A1* | 3/2015 | Bakhuis | F03D 1/0675 |
| | | | 416/229 R |
| 2015/0167473 A1 | 6/2015 | Olson | |
| 2016/0348644 A1 | 12/2016 | Hayden et al. | |
| 2017/0058863 A1 | 3/2017 | Yarbrough et al. | |

* cited by examiner

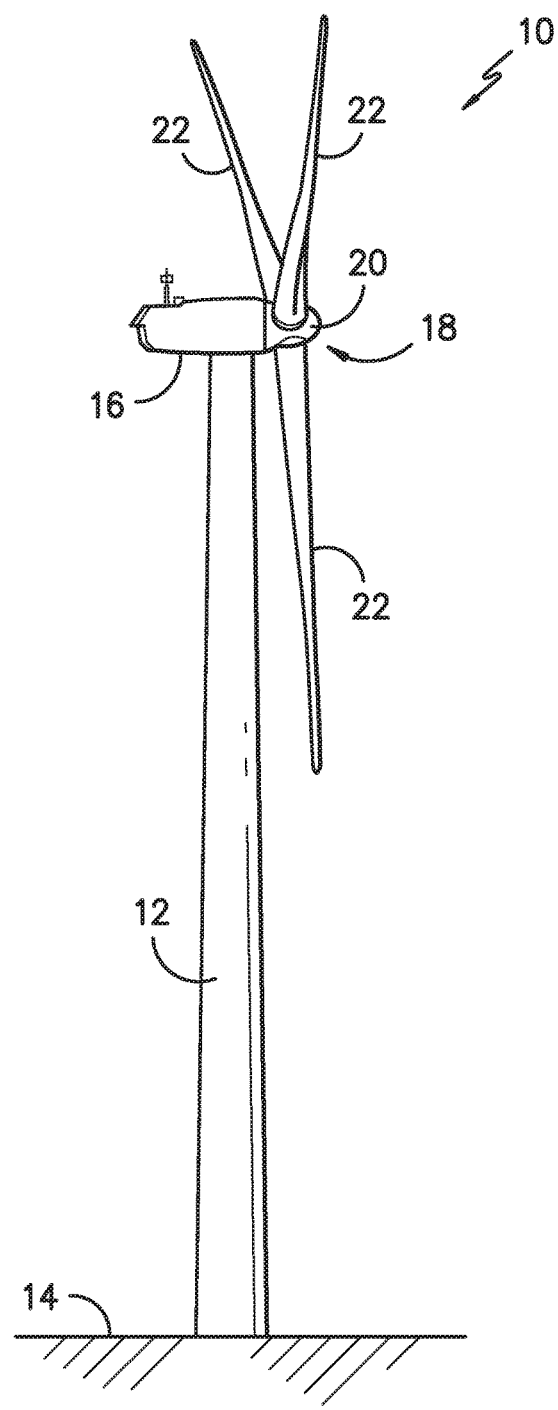
FIG. -1-

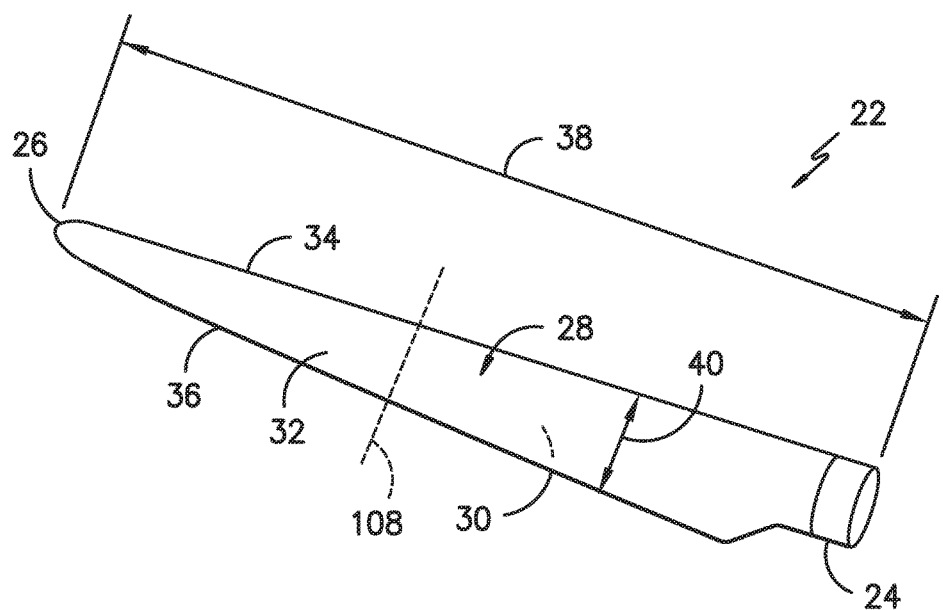
FIG. -2-

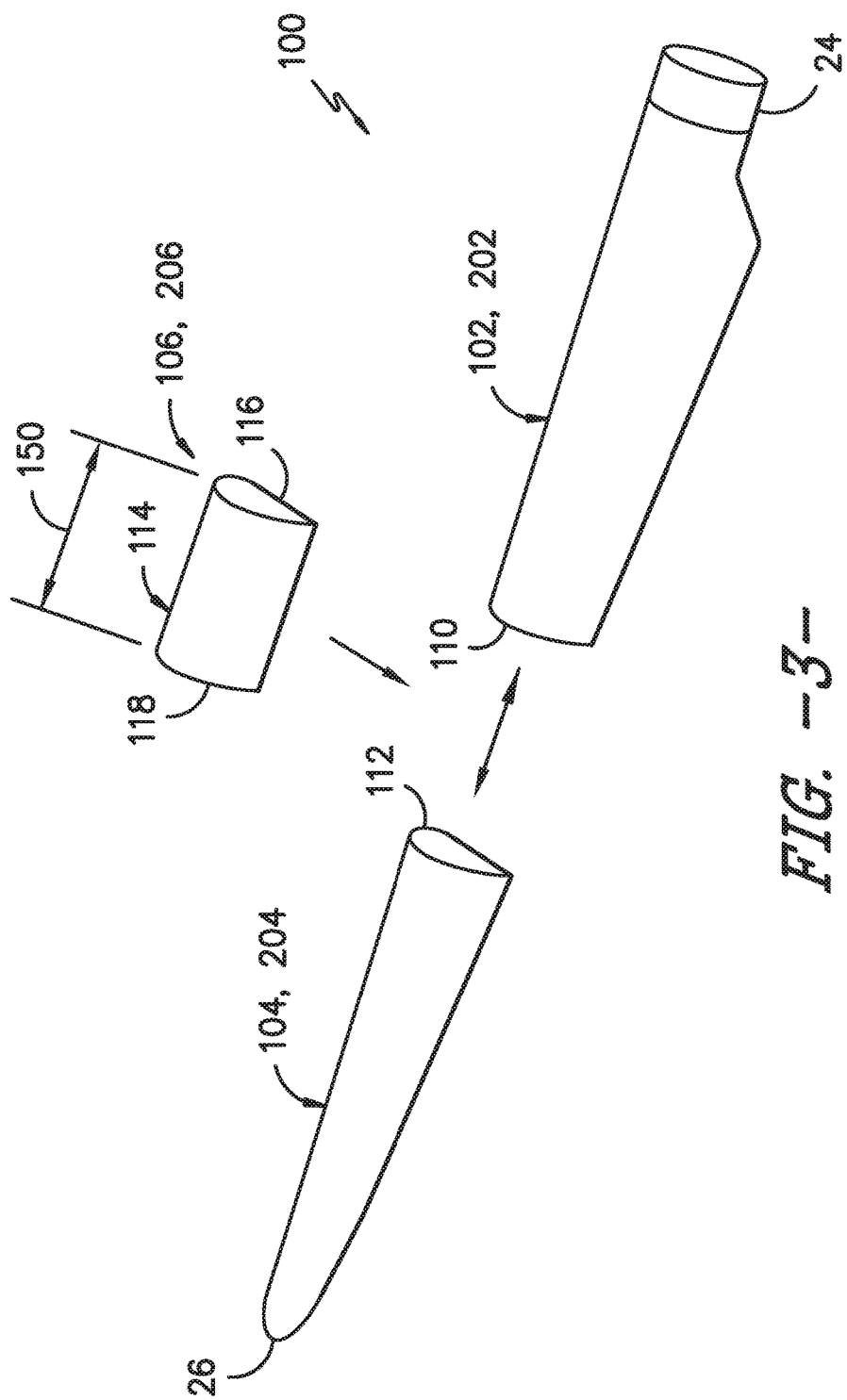

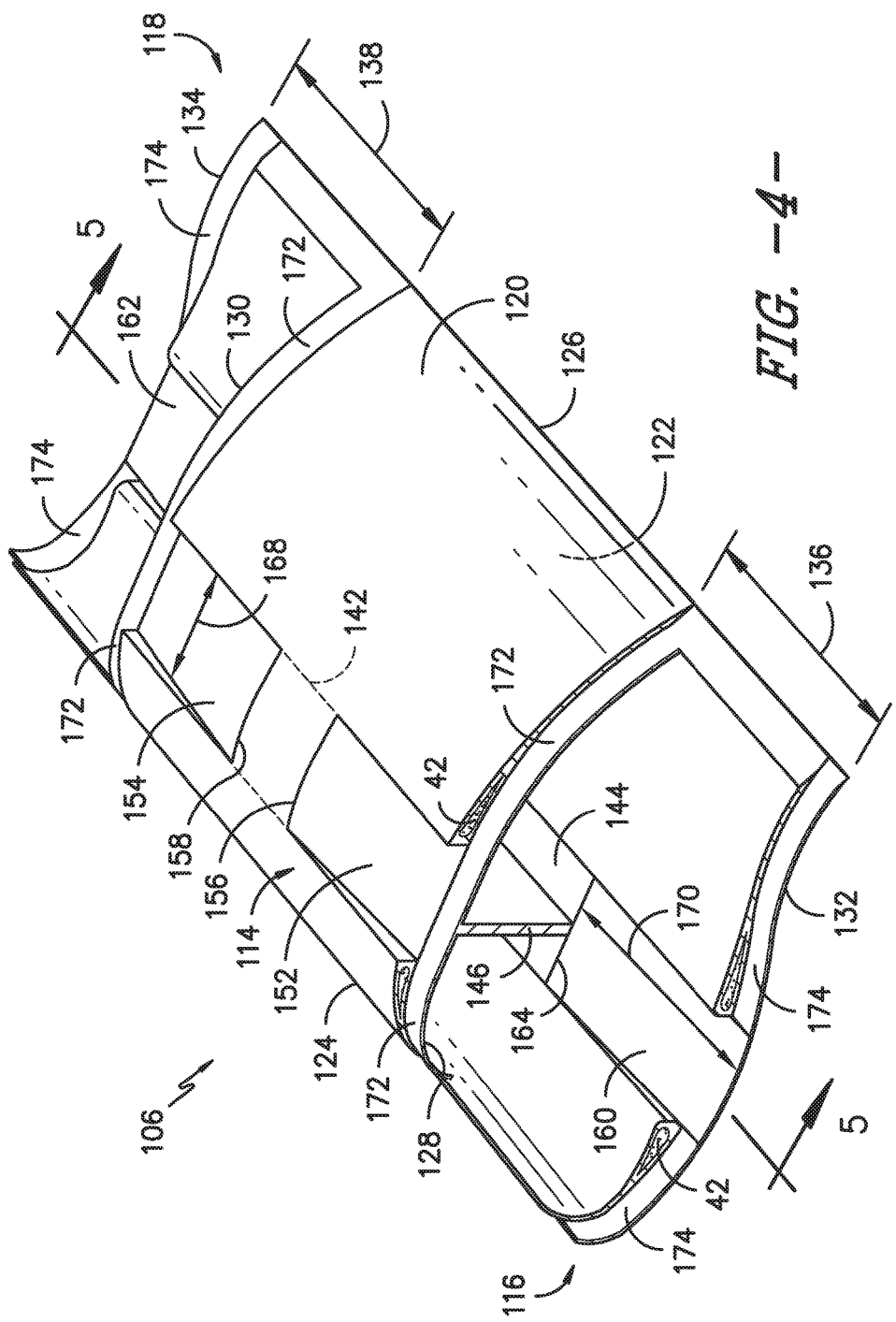

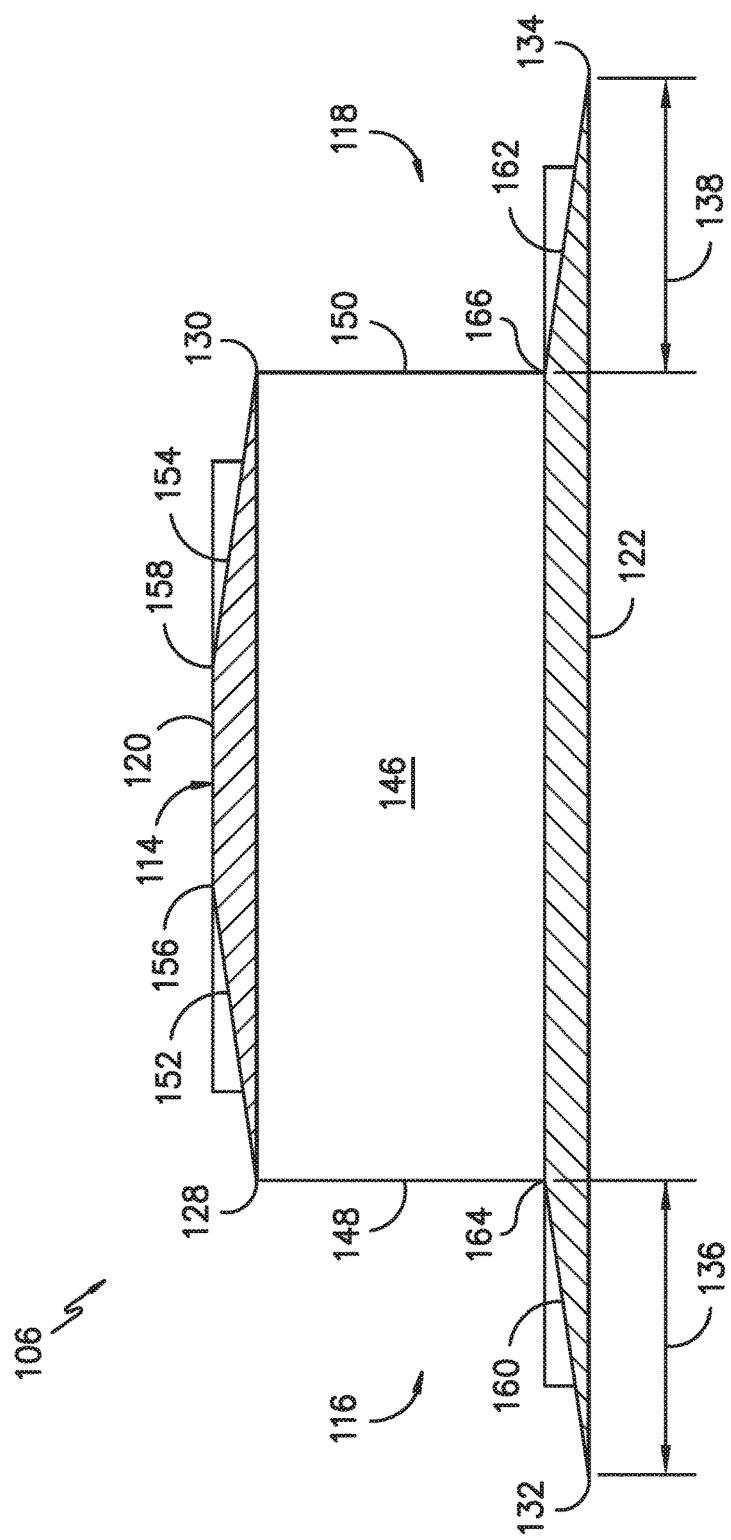
FIG. -5-

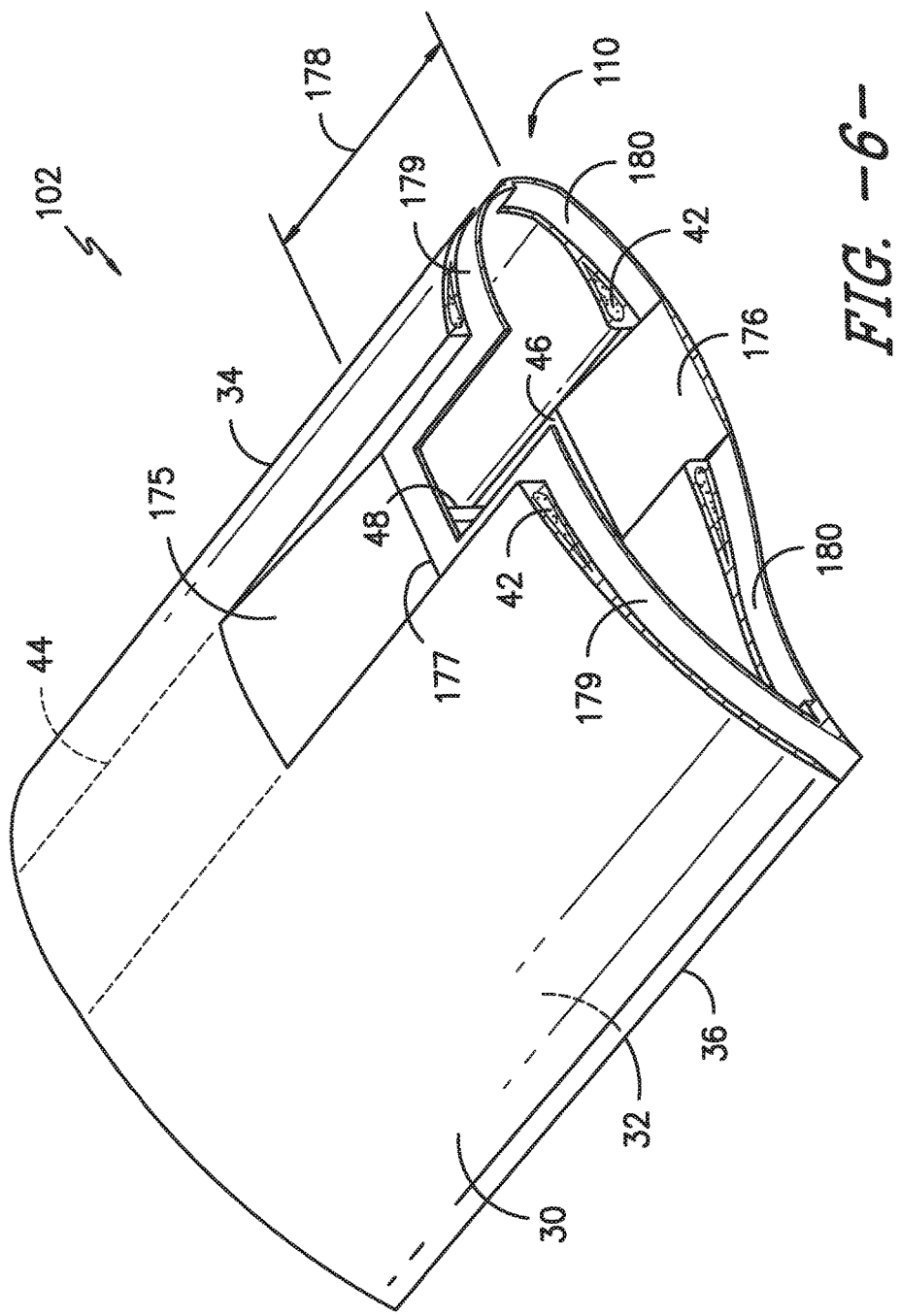
FIG. -6-

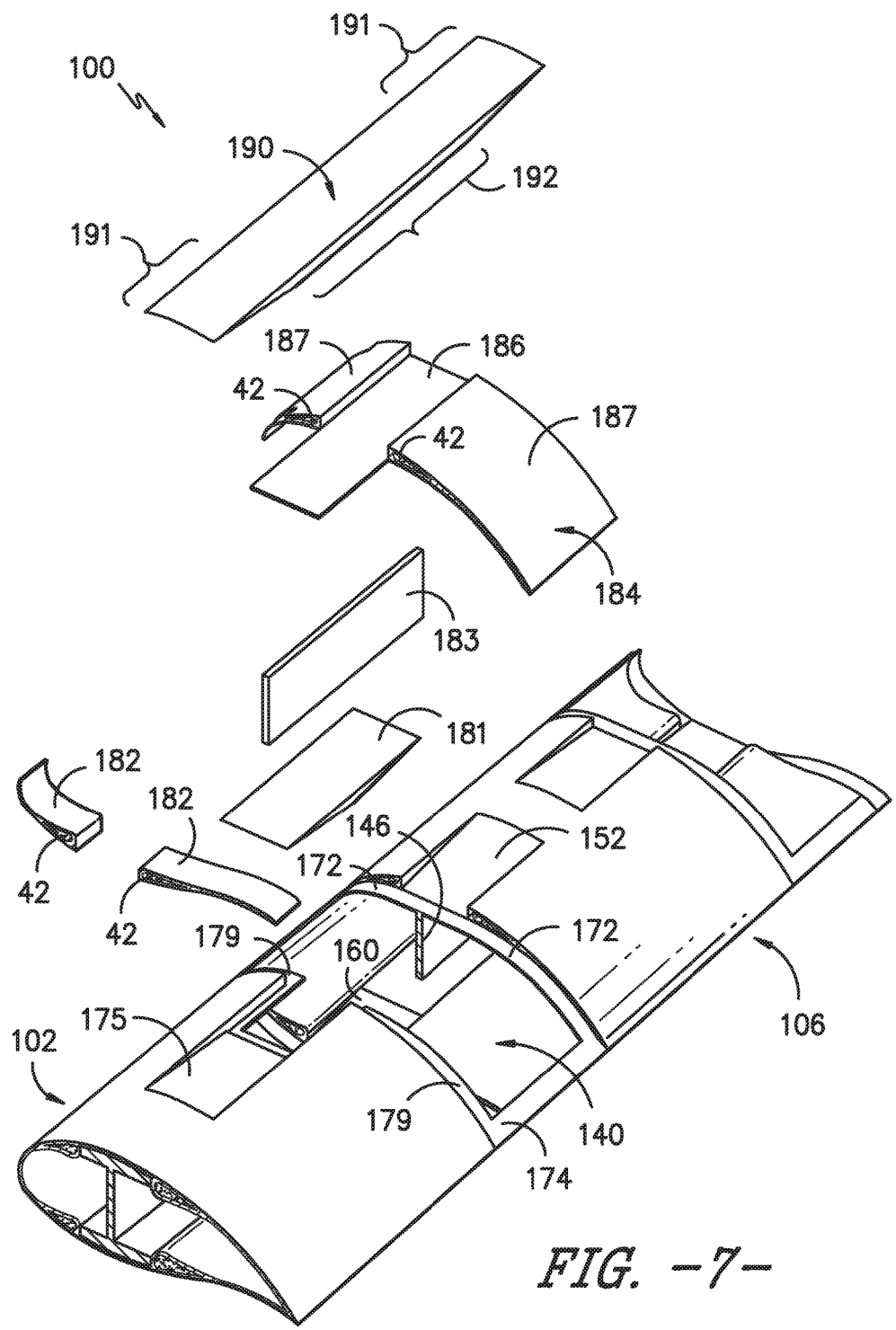
FIG. -7-

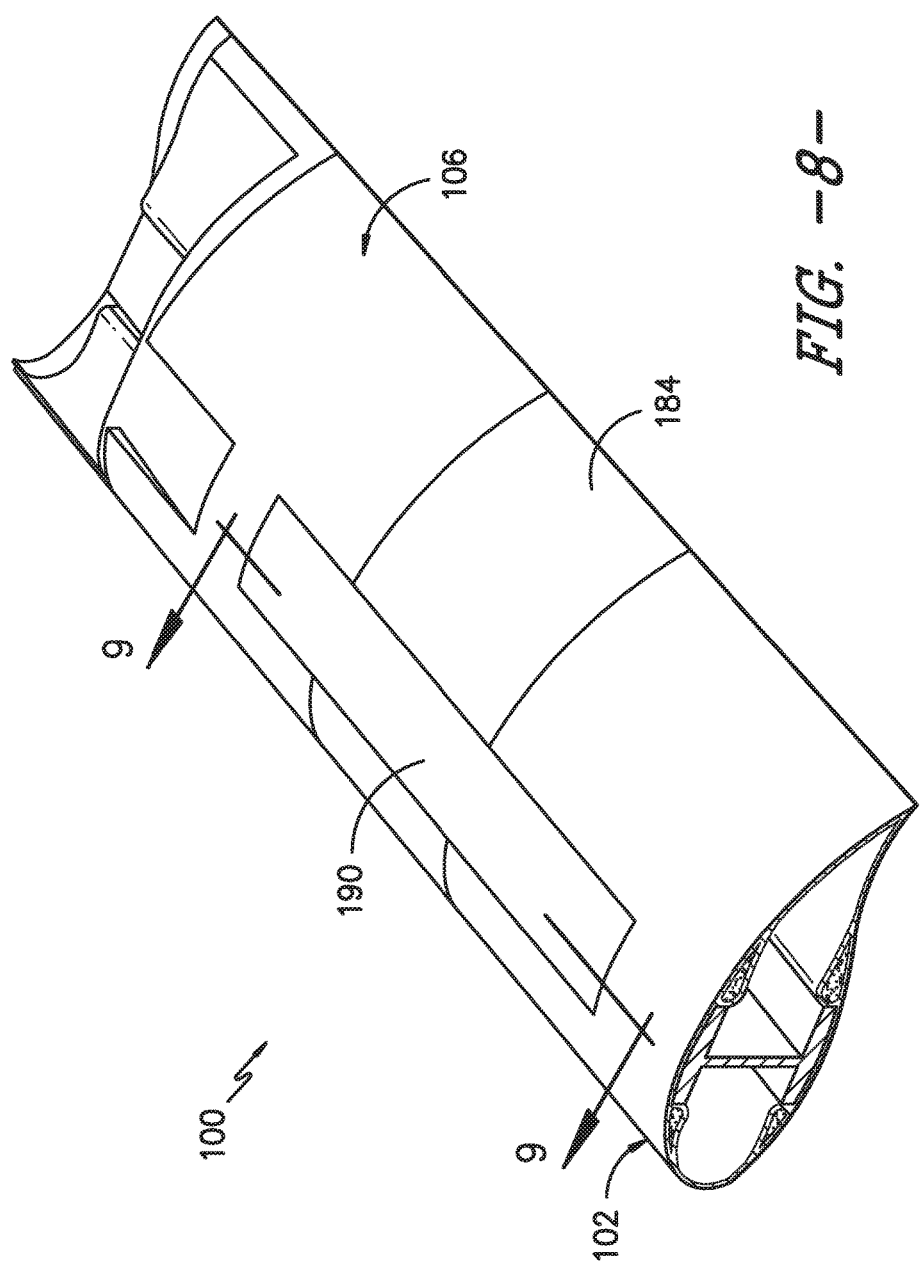
FIG. -8-

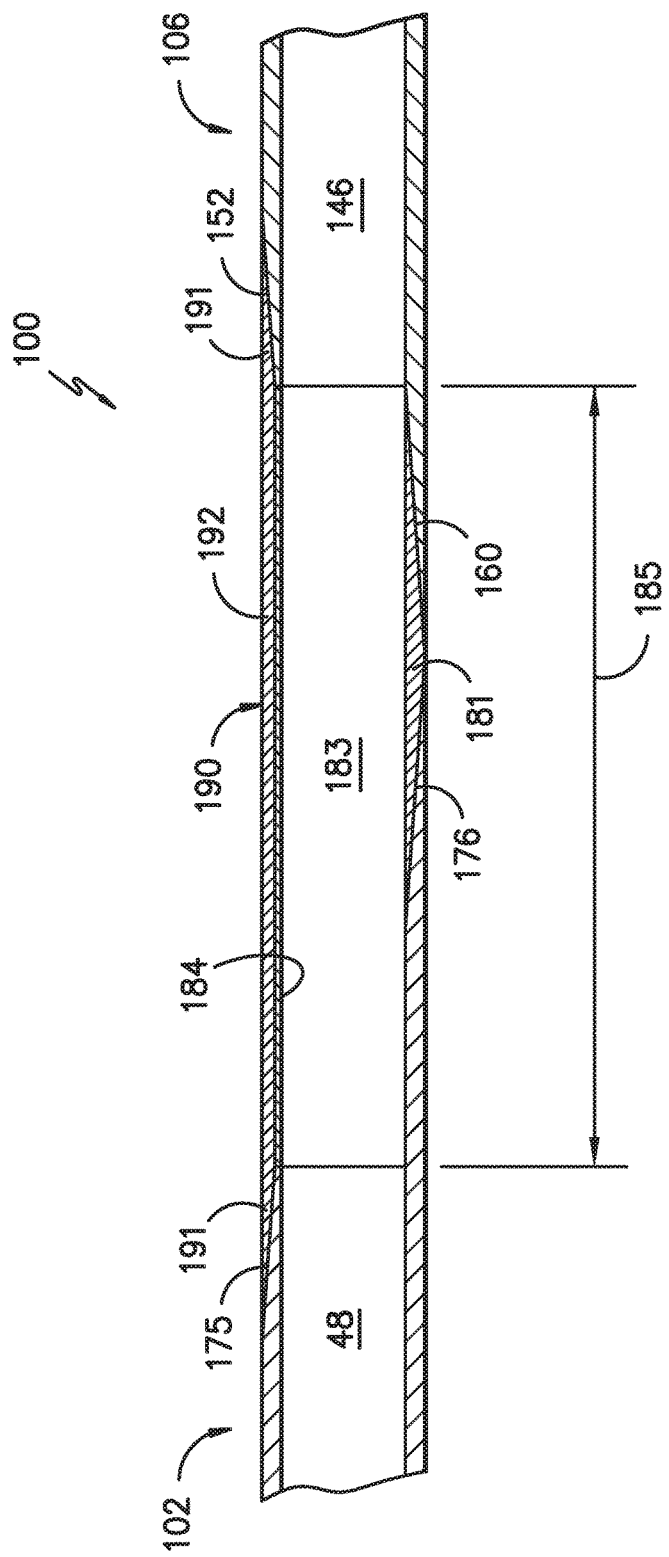
FIG. -9-

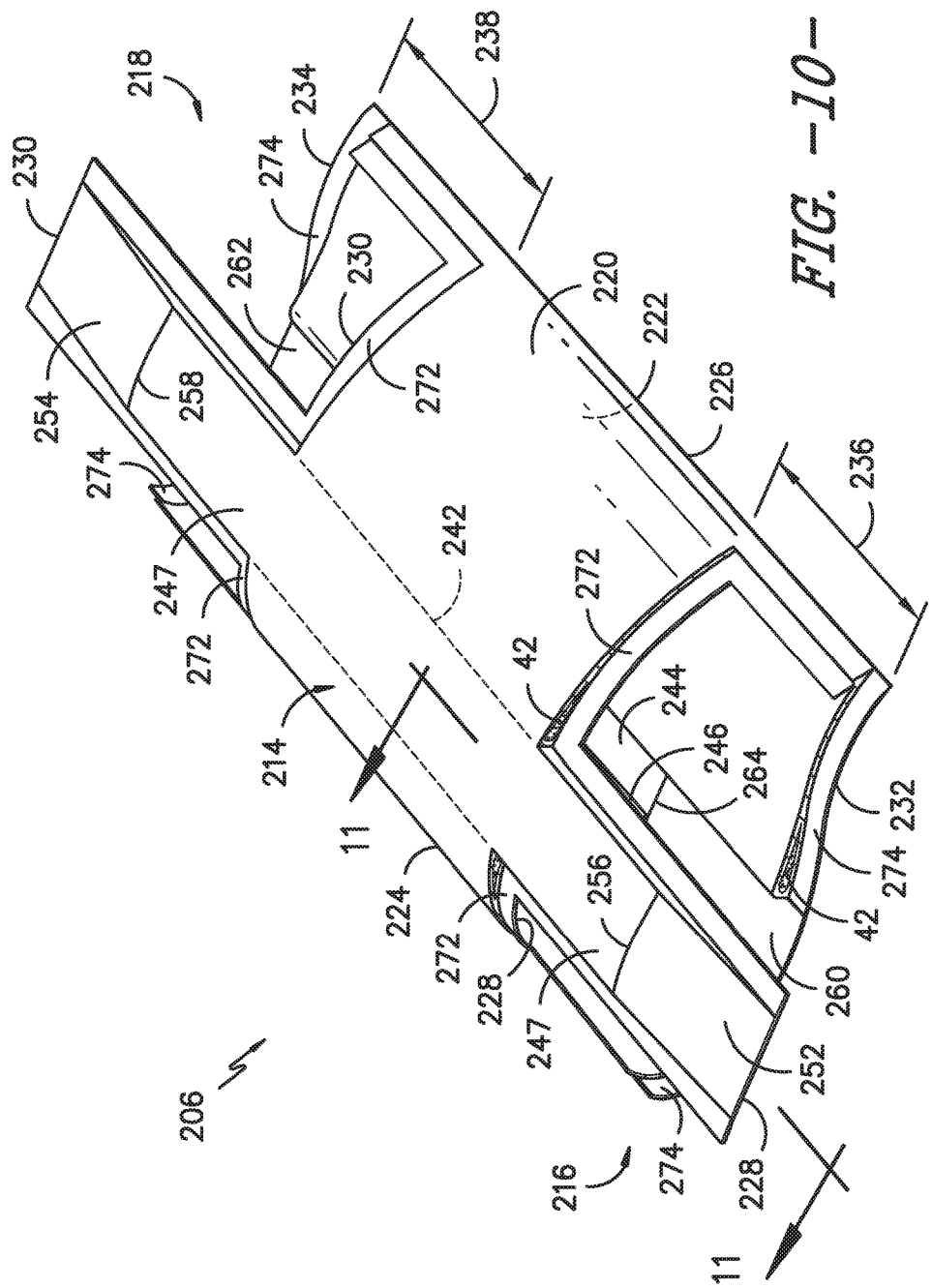

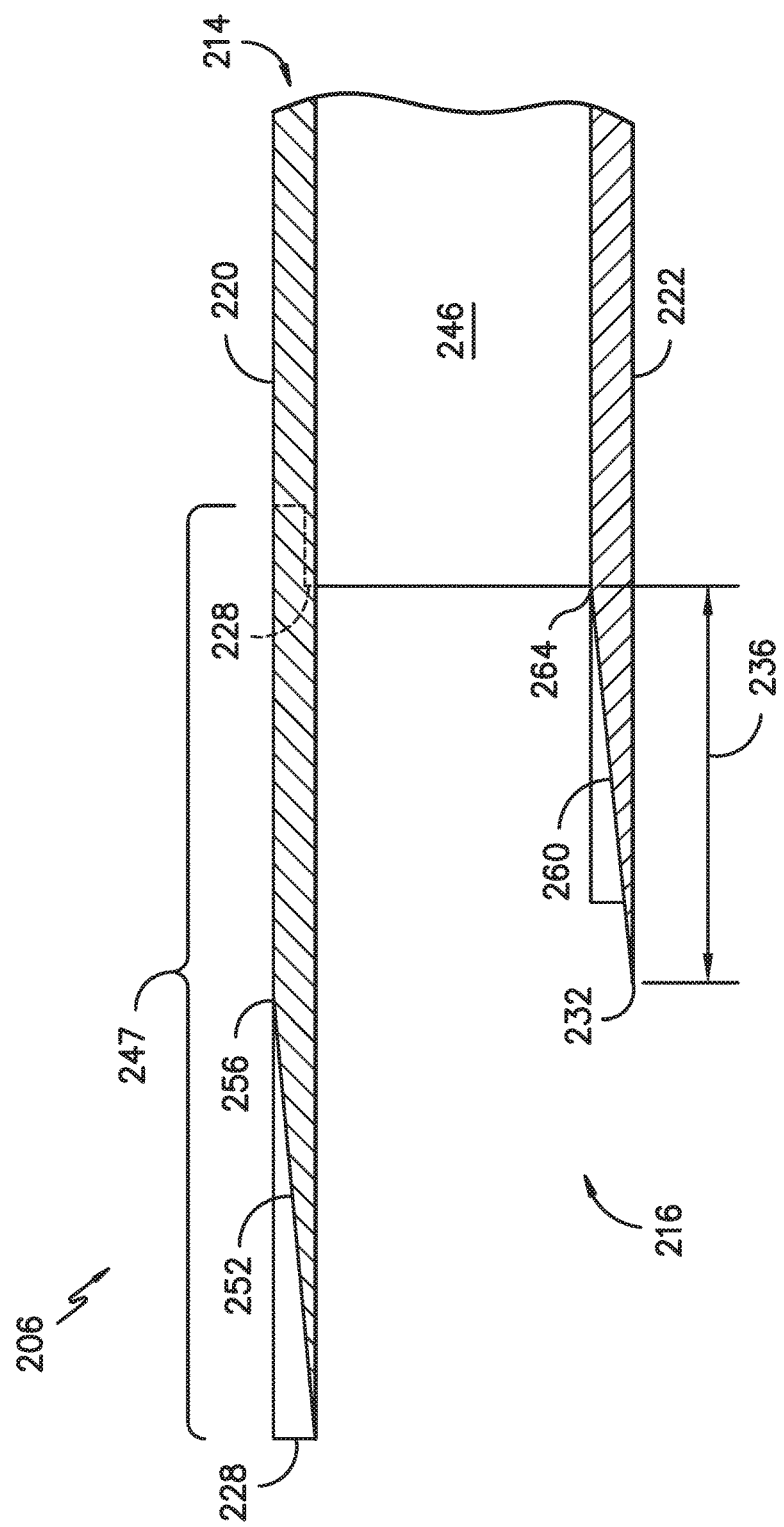

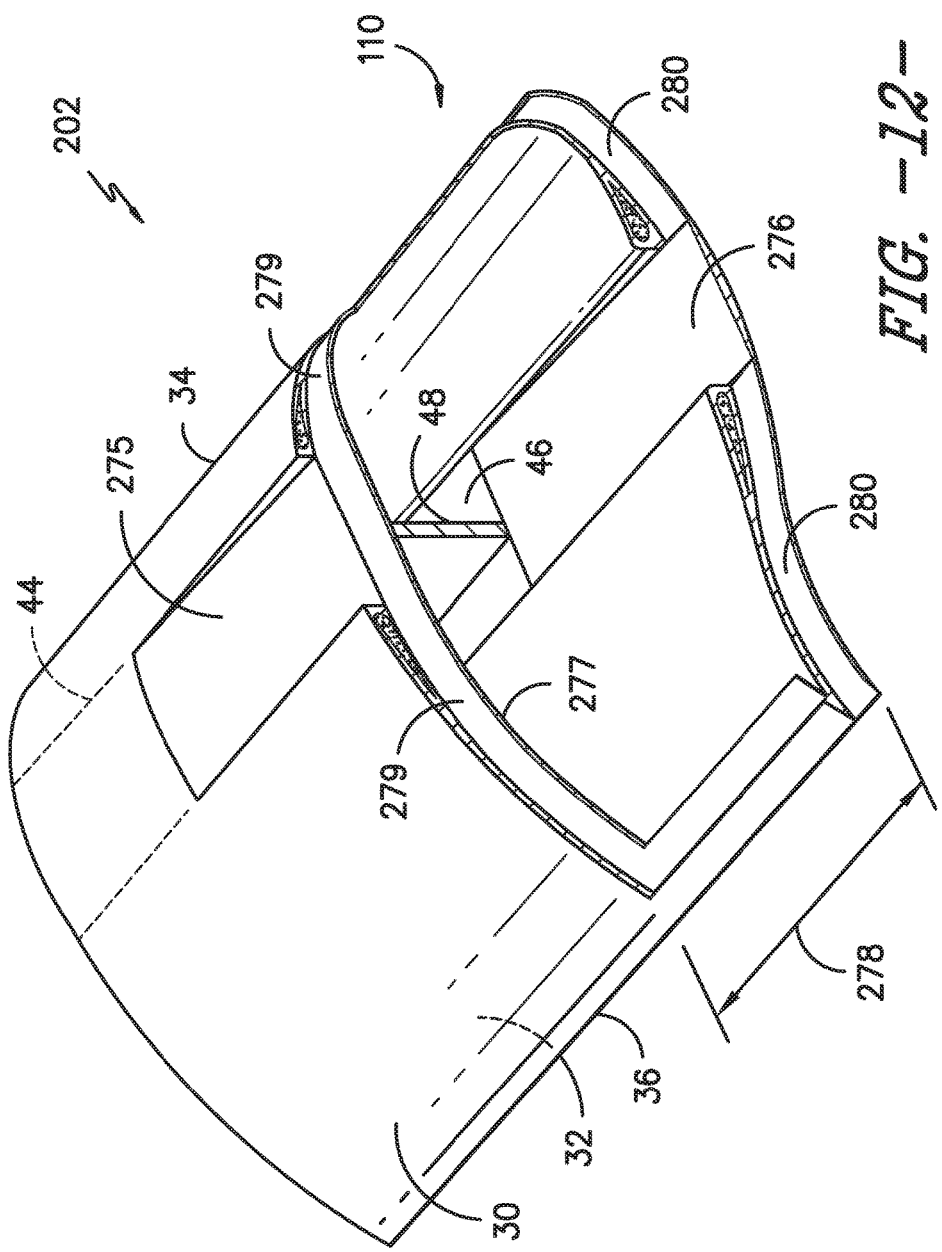
FIG. -12-

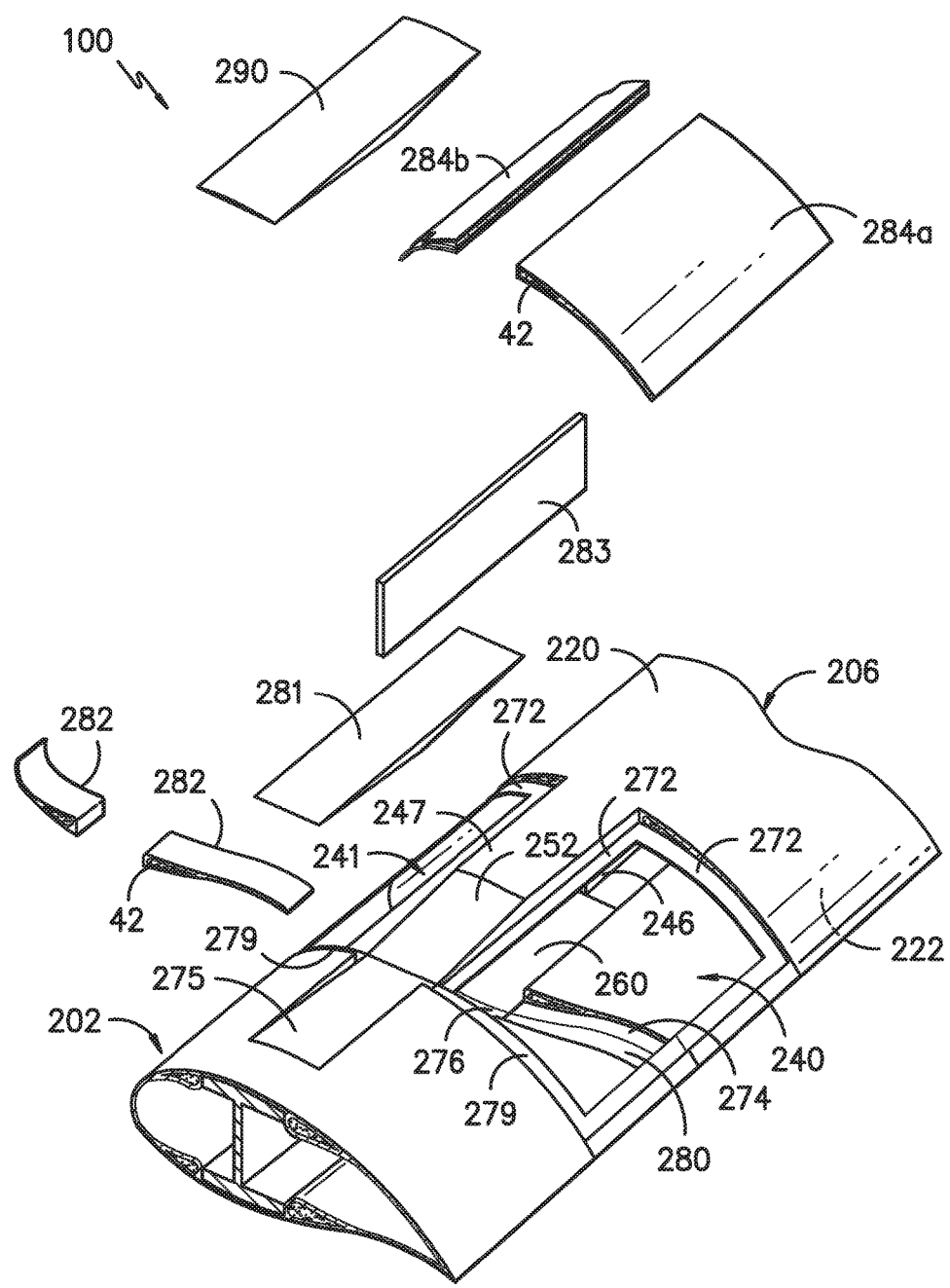
FIG. -13-

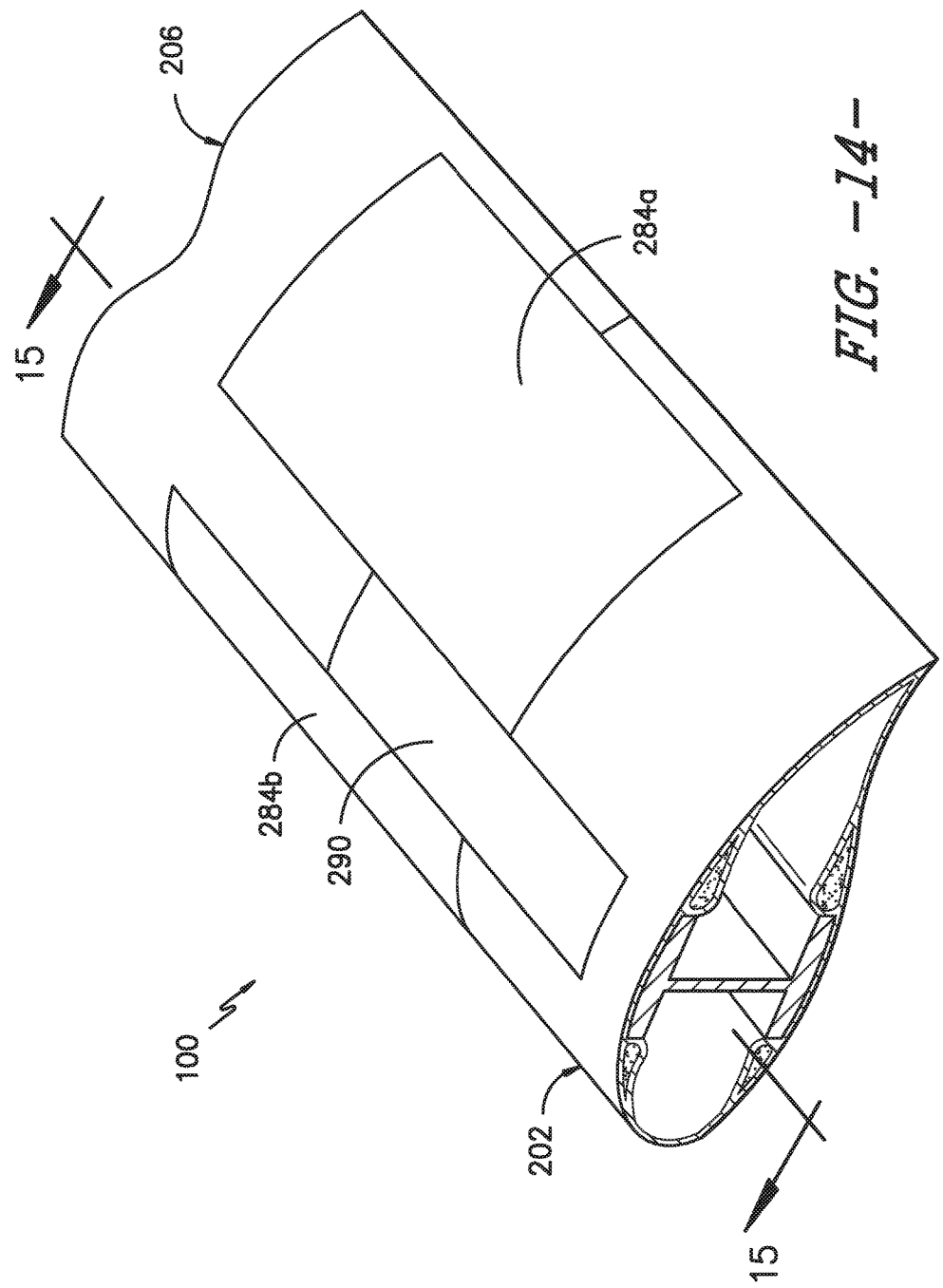
FIG. -14-

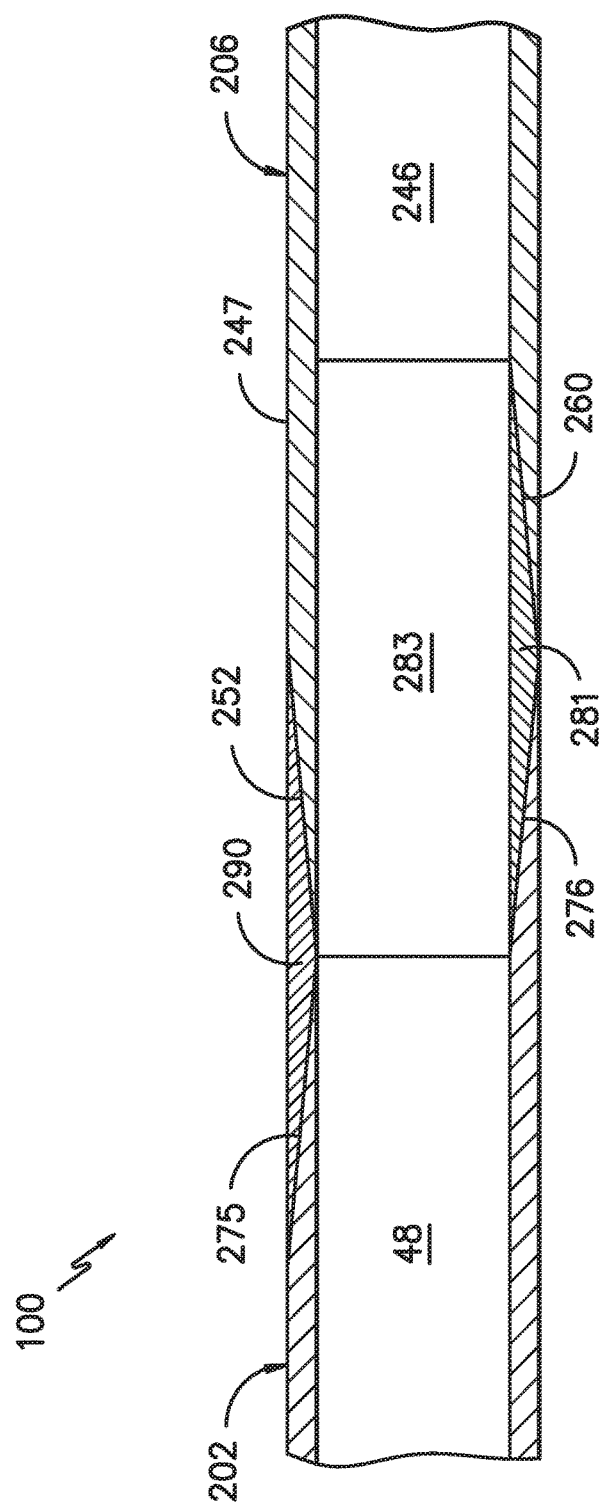
FIG. -15-

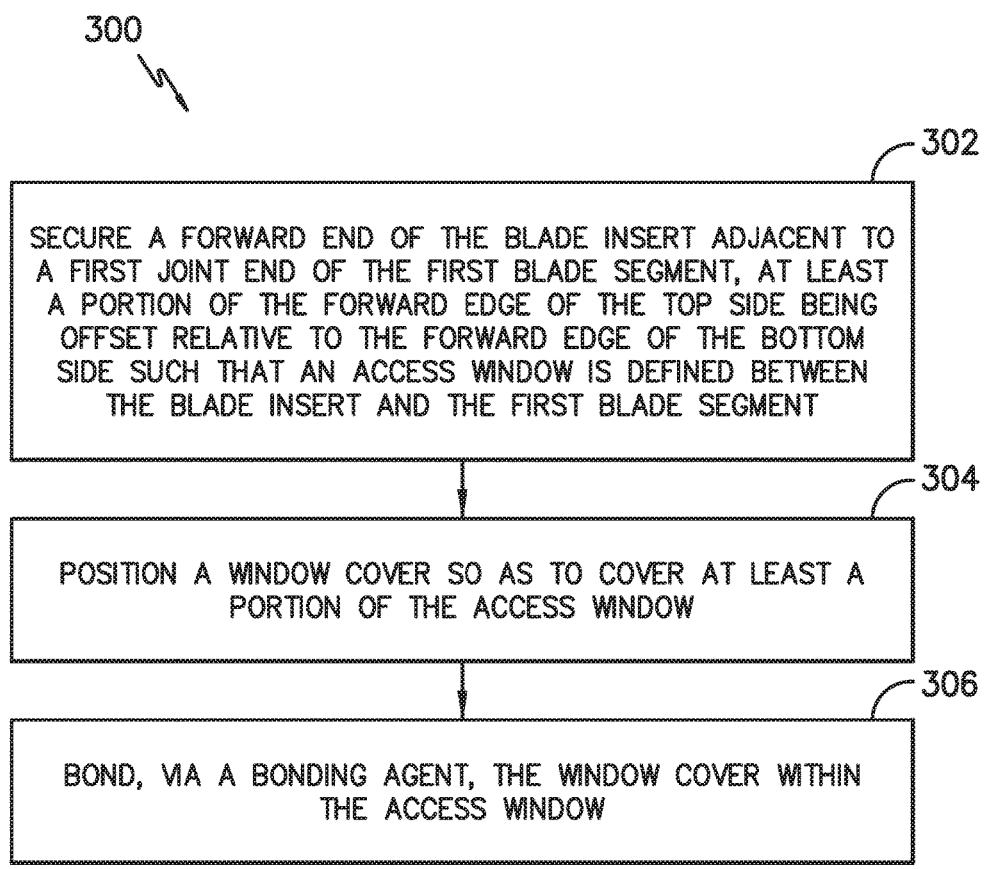
FIG. -16-

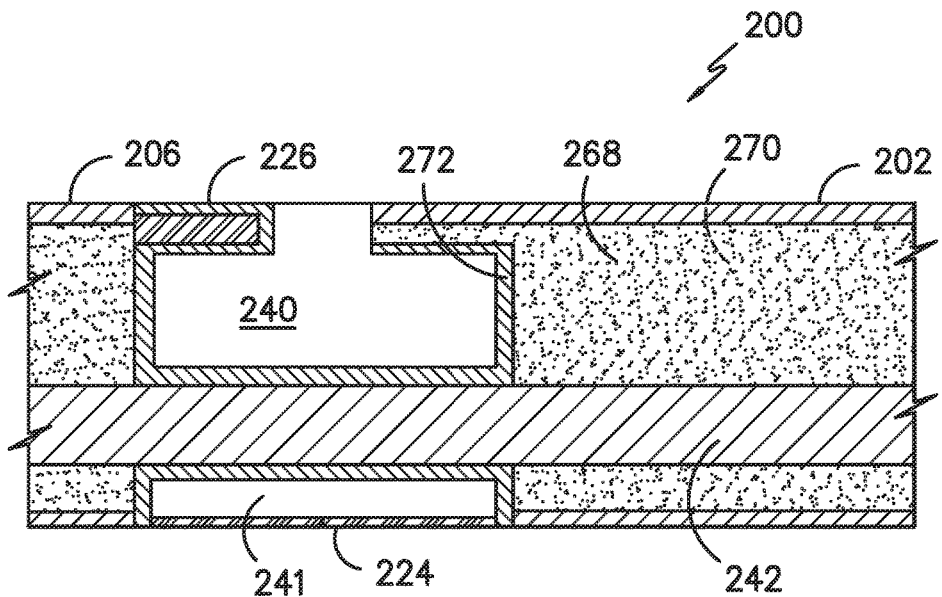
FIG. -17-
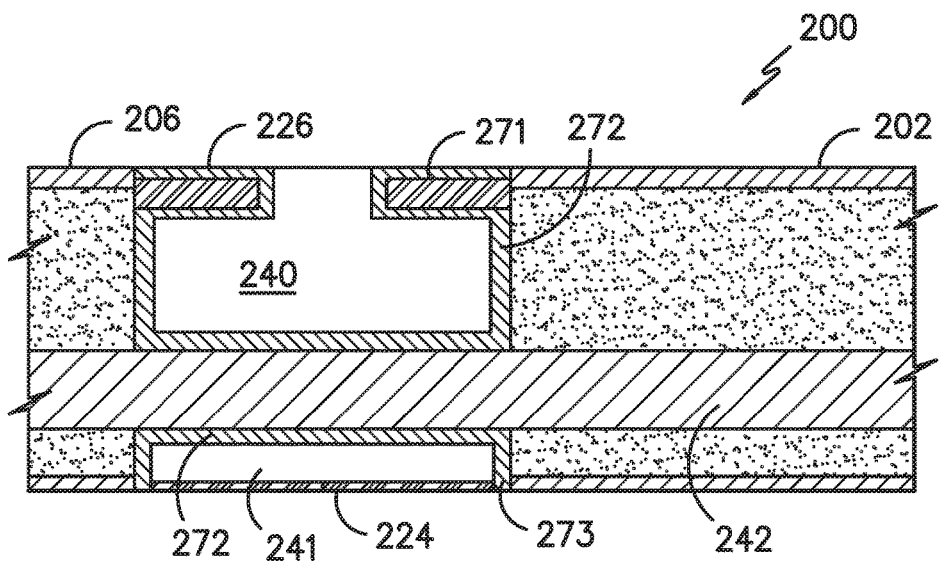
FIG. -18-

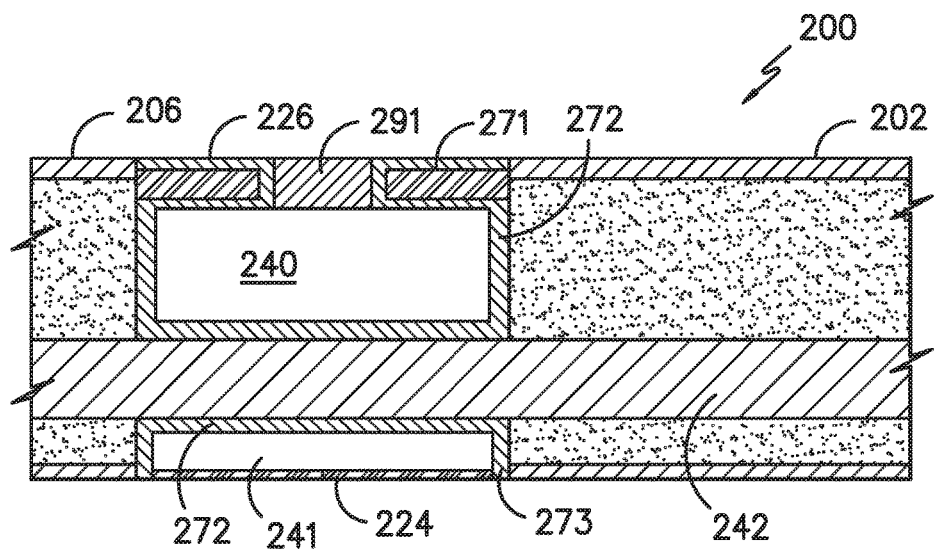
FIG. -19-
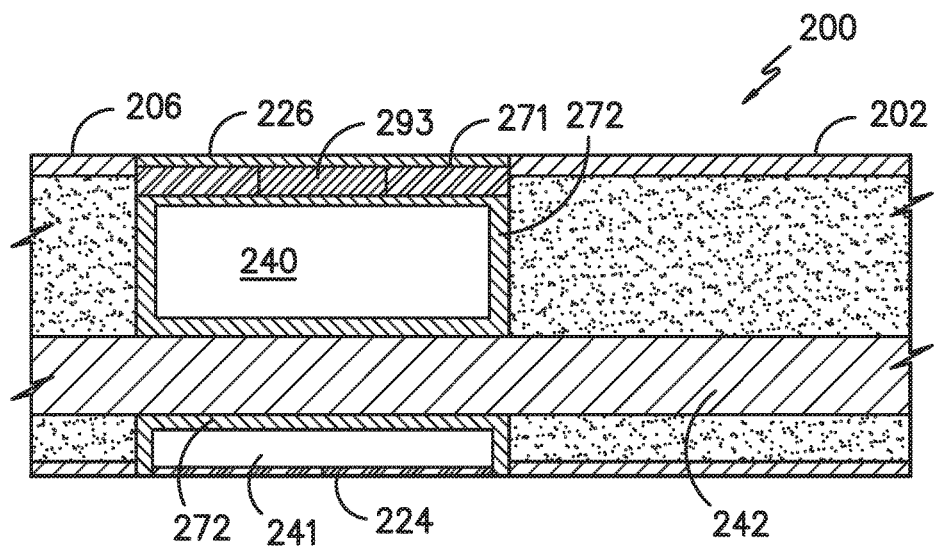
FIG. -20-

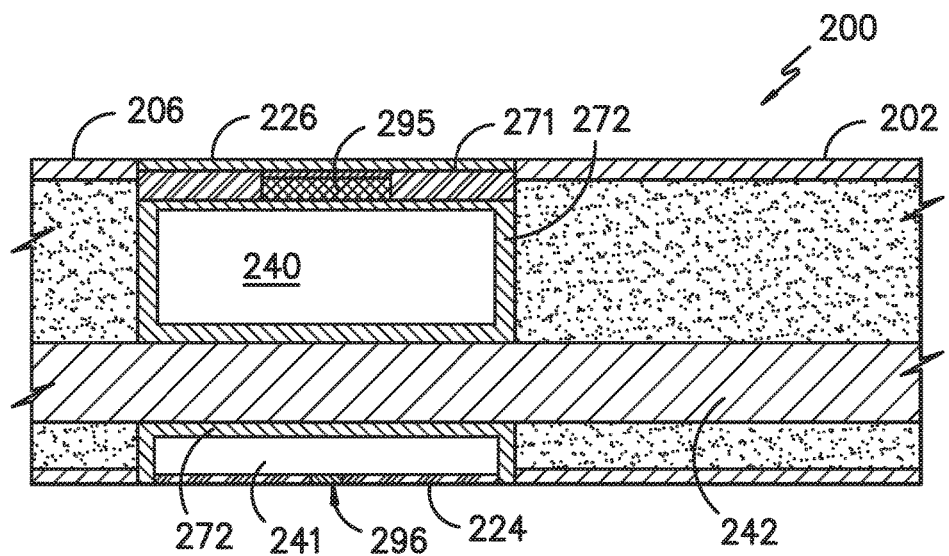
FIG. -21-
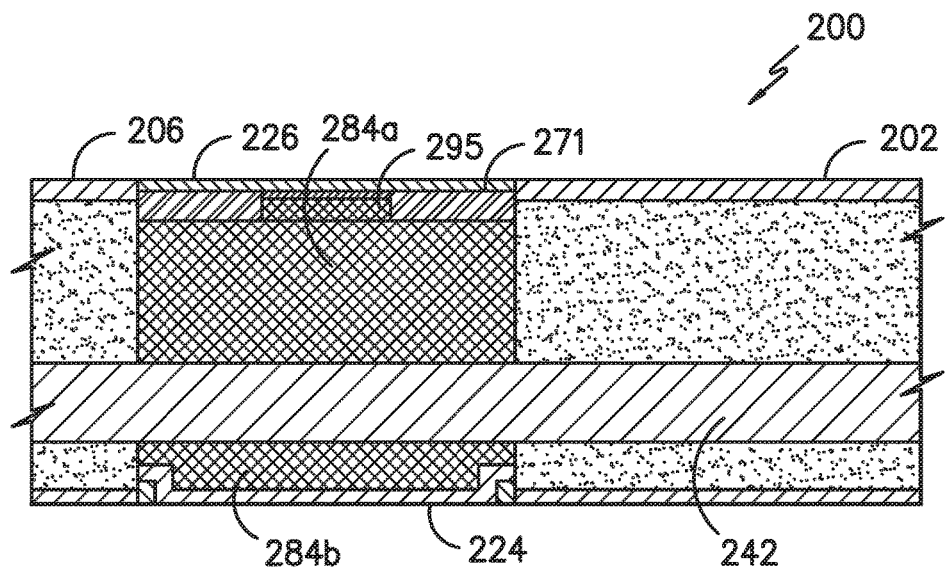
FIG. -22-

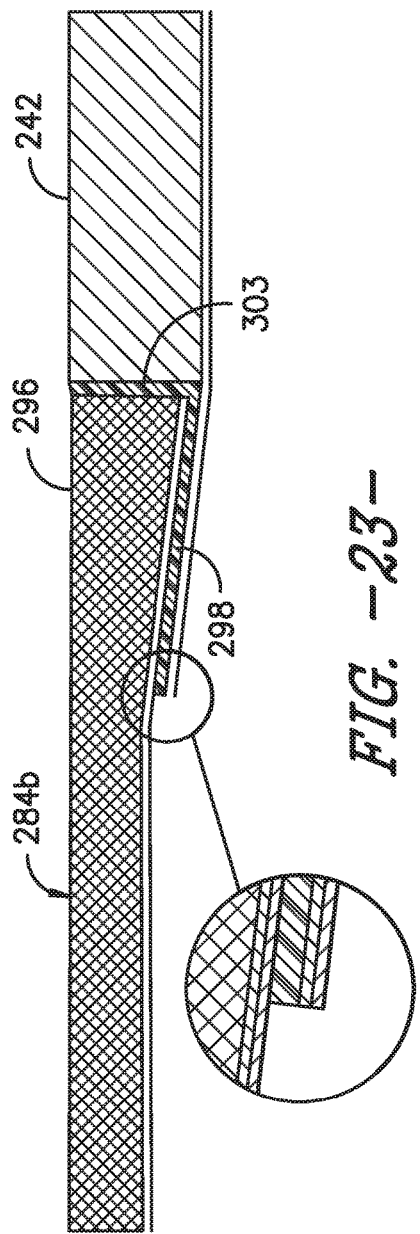
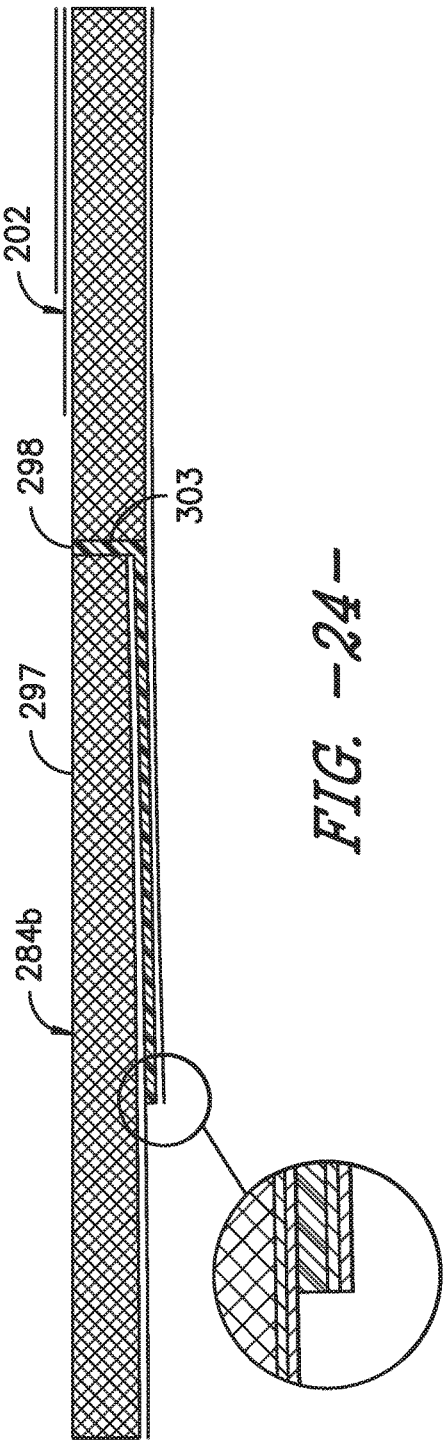

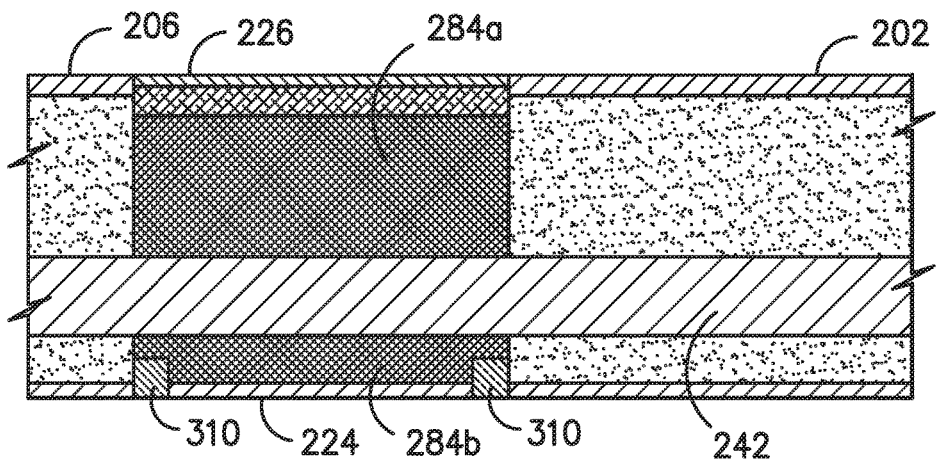
FIG. -25-
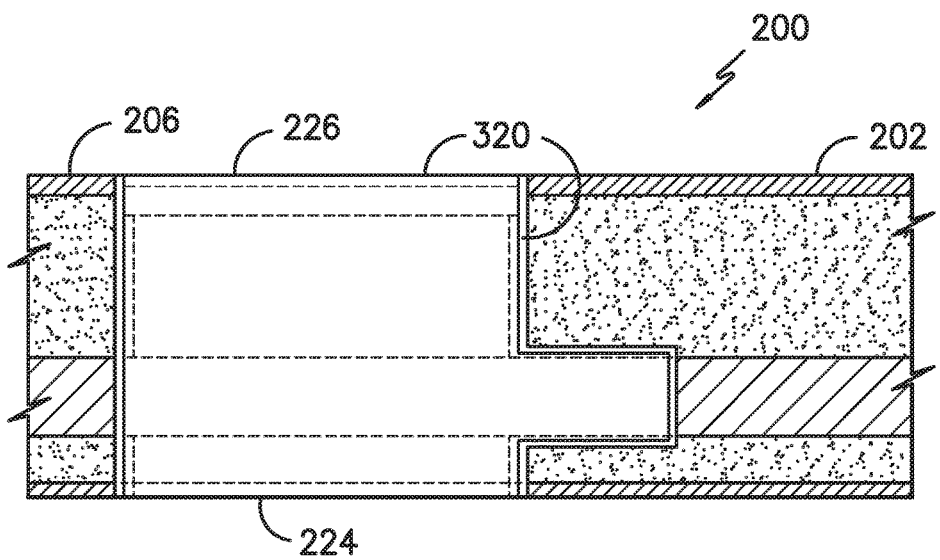
FIG. -26-

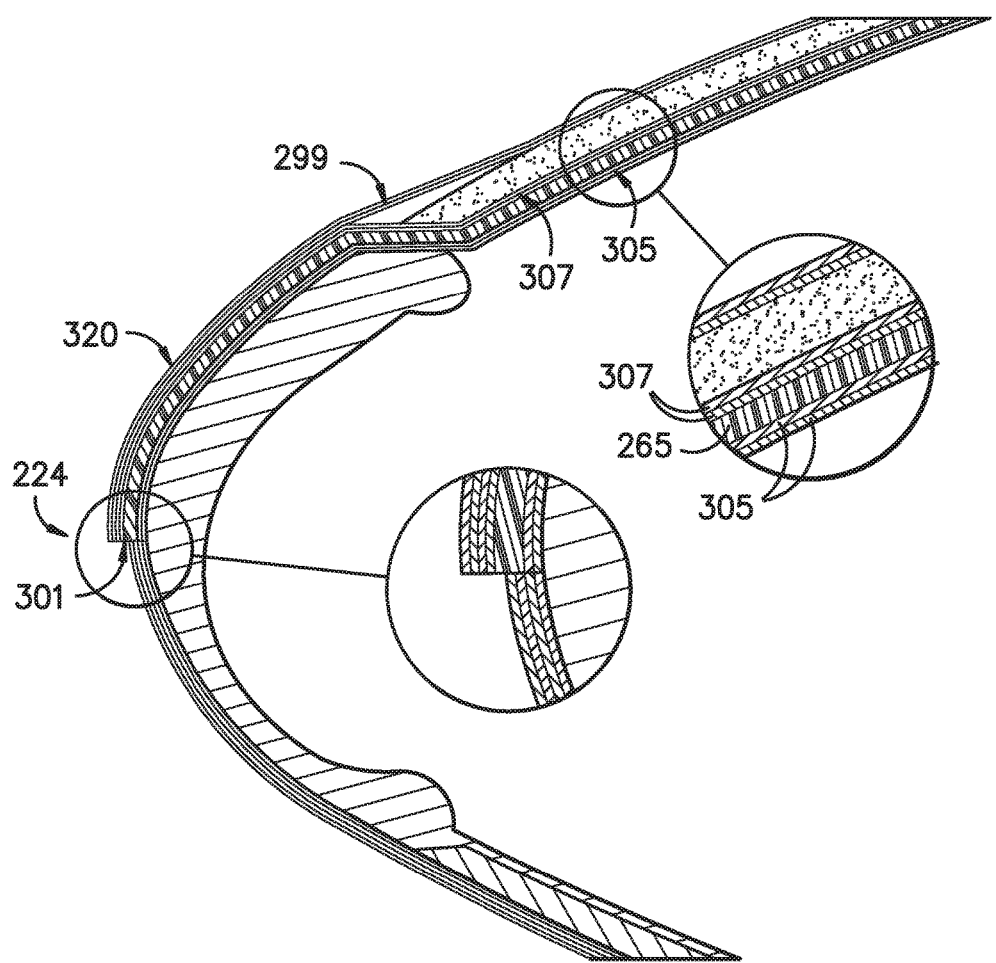
FIG. -27-

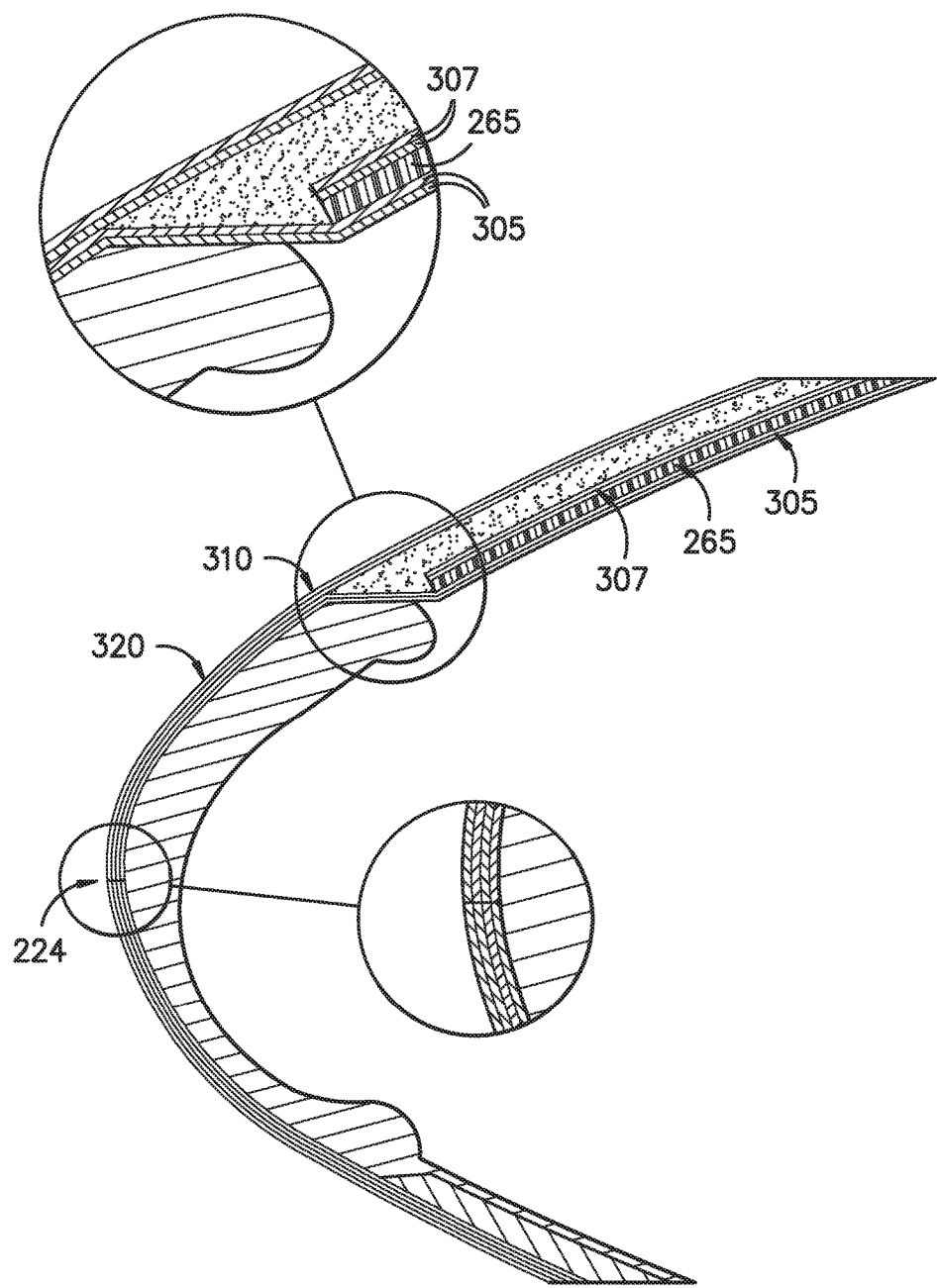
FIG. -28-

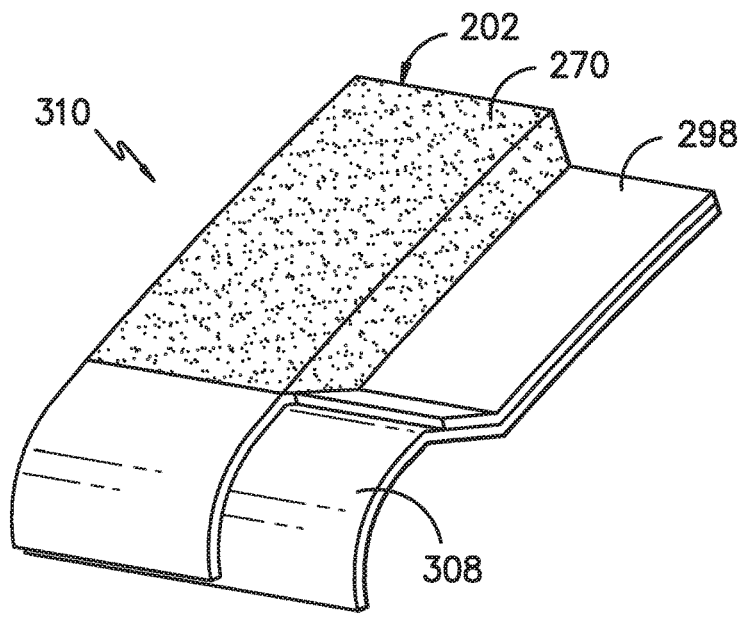
FIG. -29-
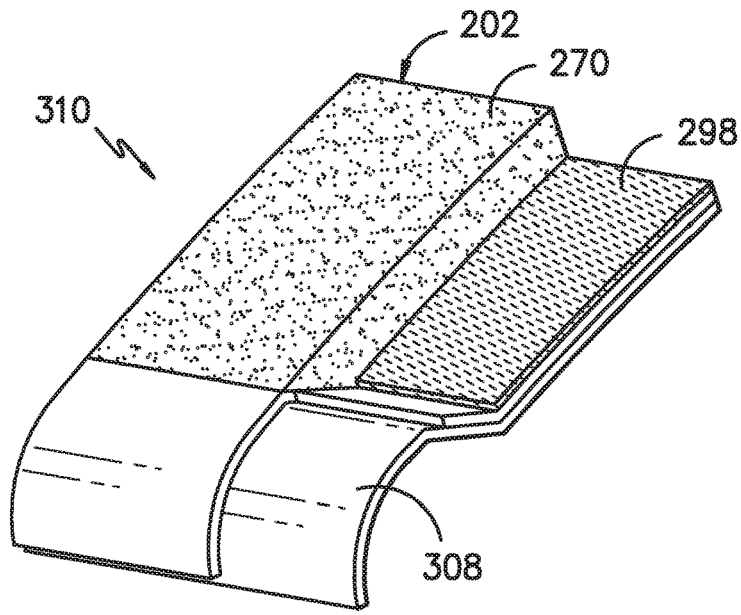
FIG. -30-

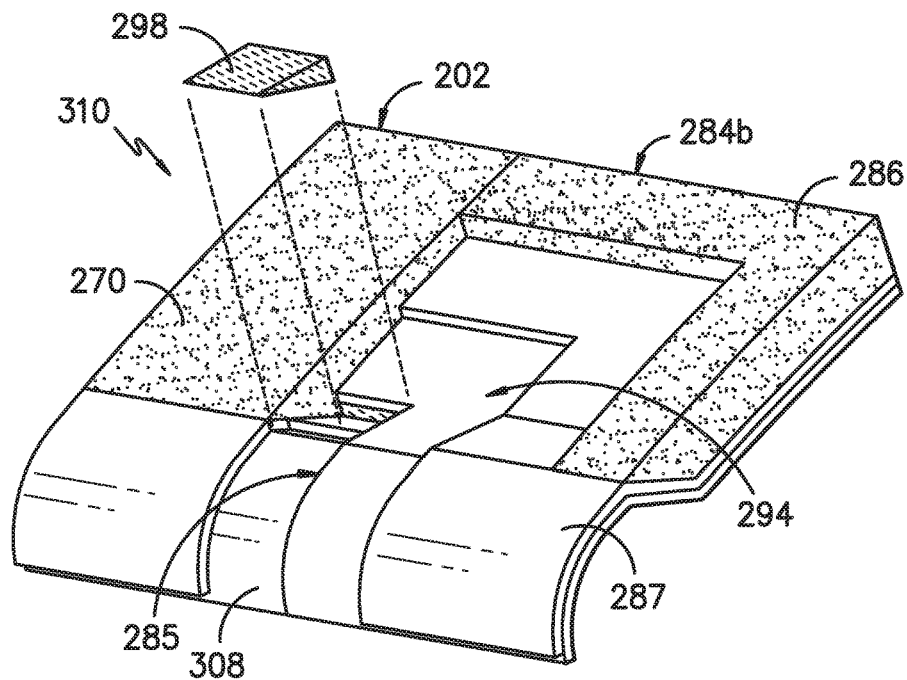
FIG. -31-
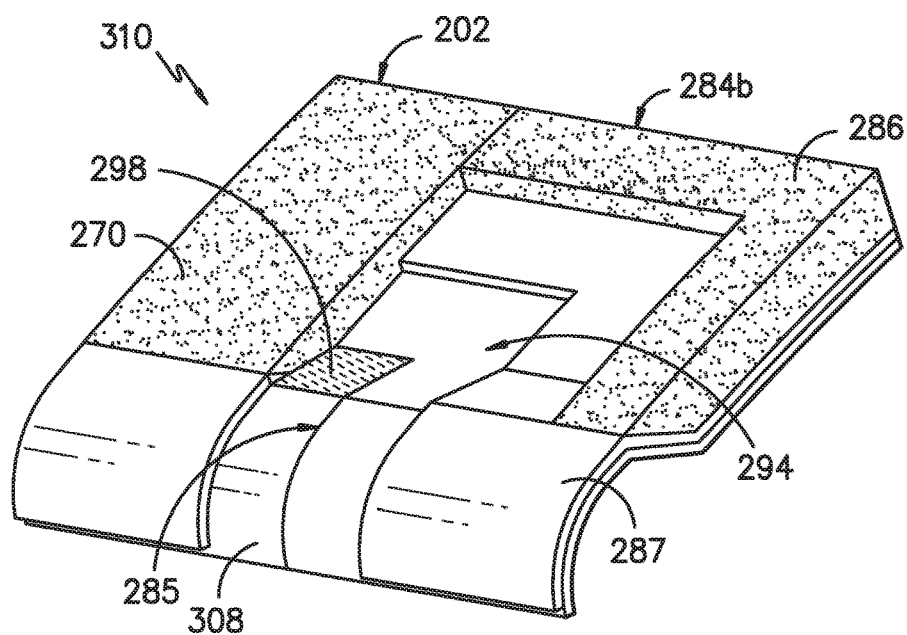
FIG. -32-

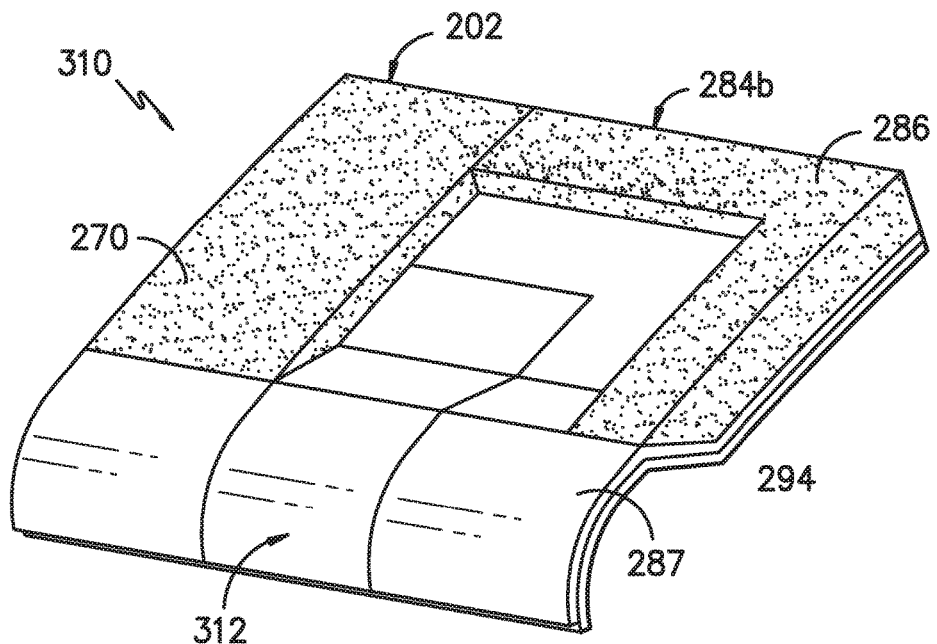
FIG. -33-
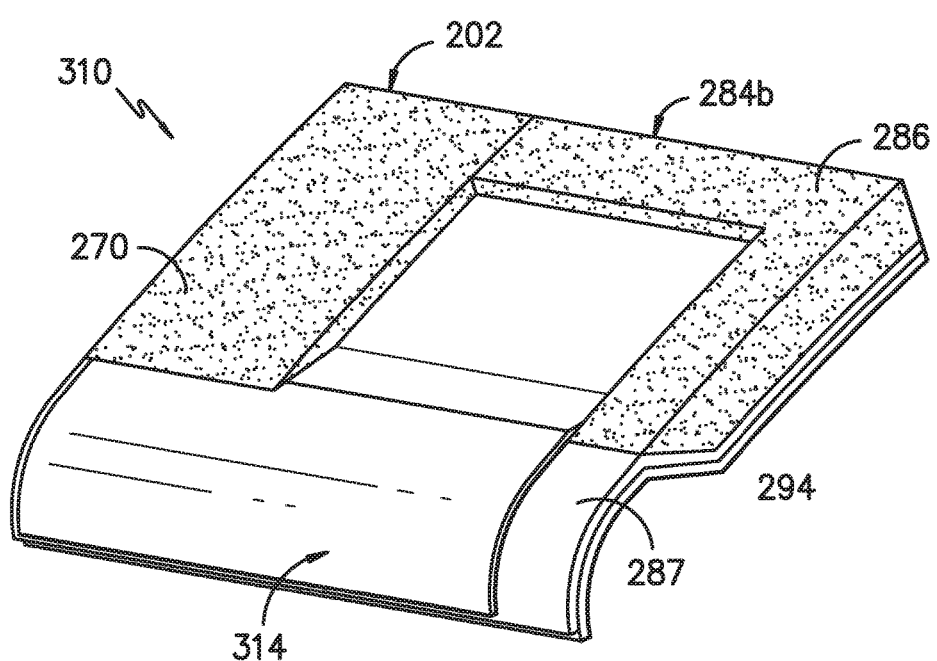
FIG. -34-

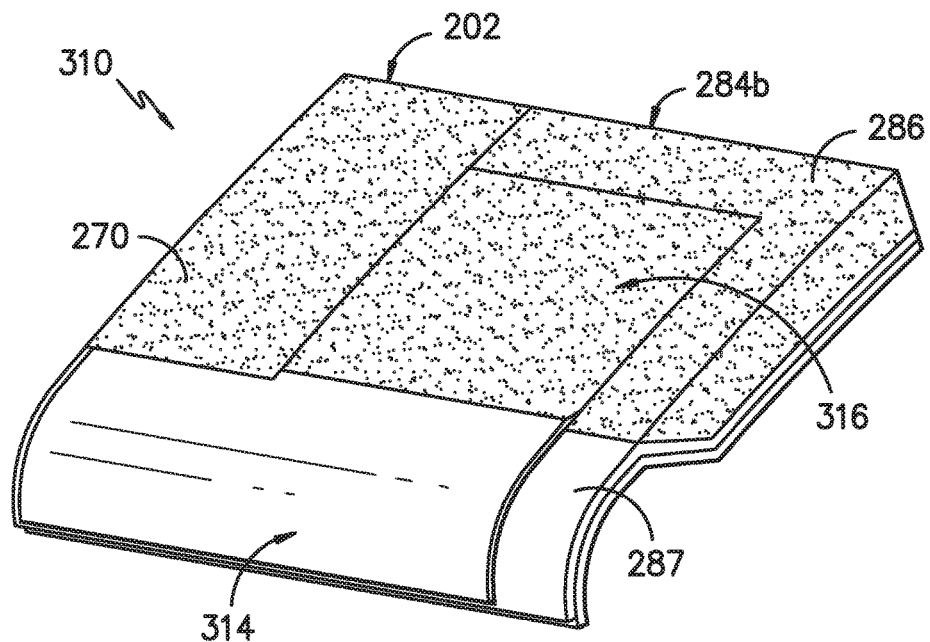
FIG. -35-
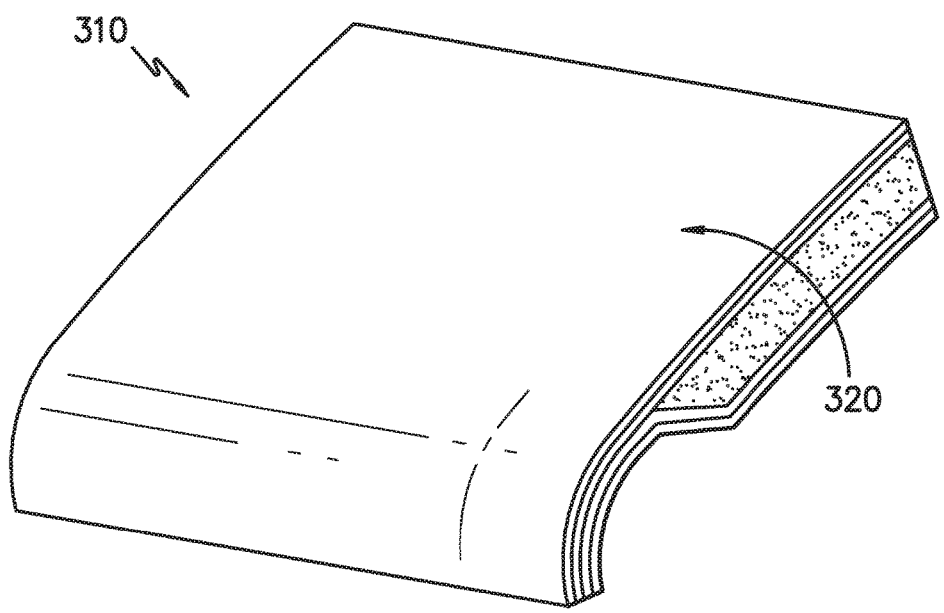
FIG. -36-

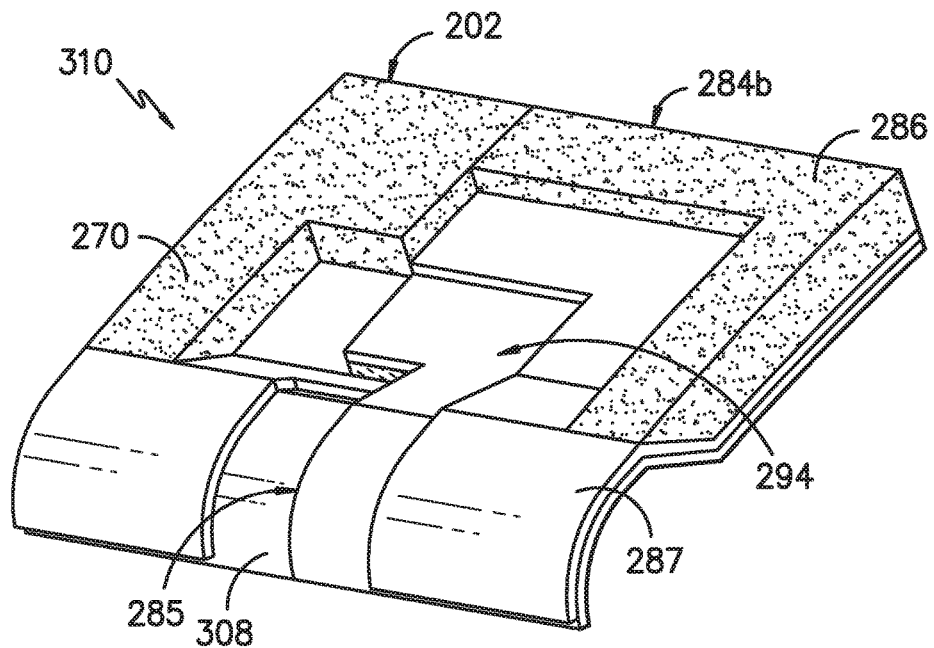
FIG. -37-
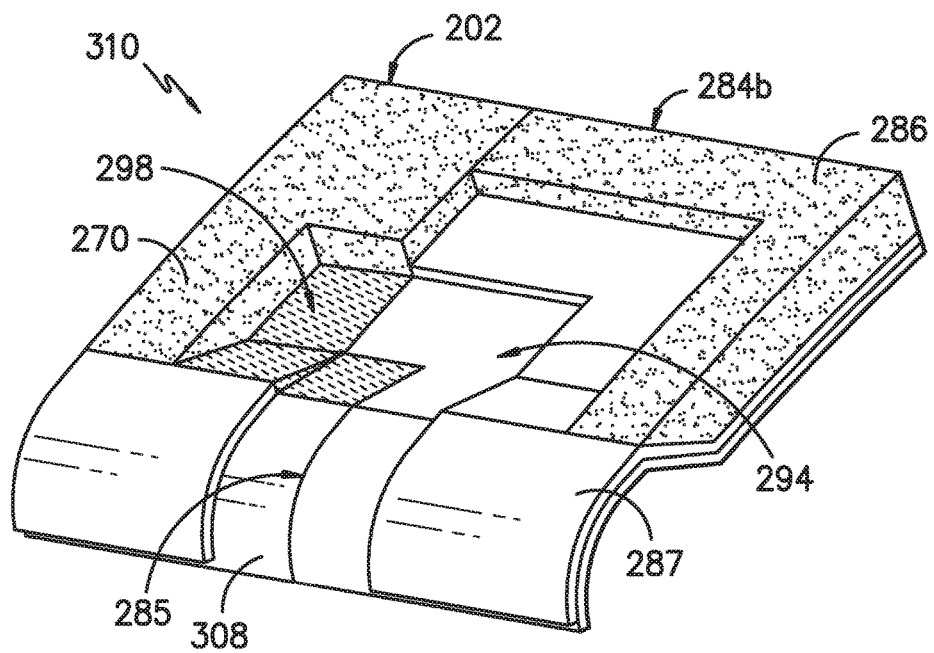
FIG. -38-

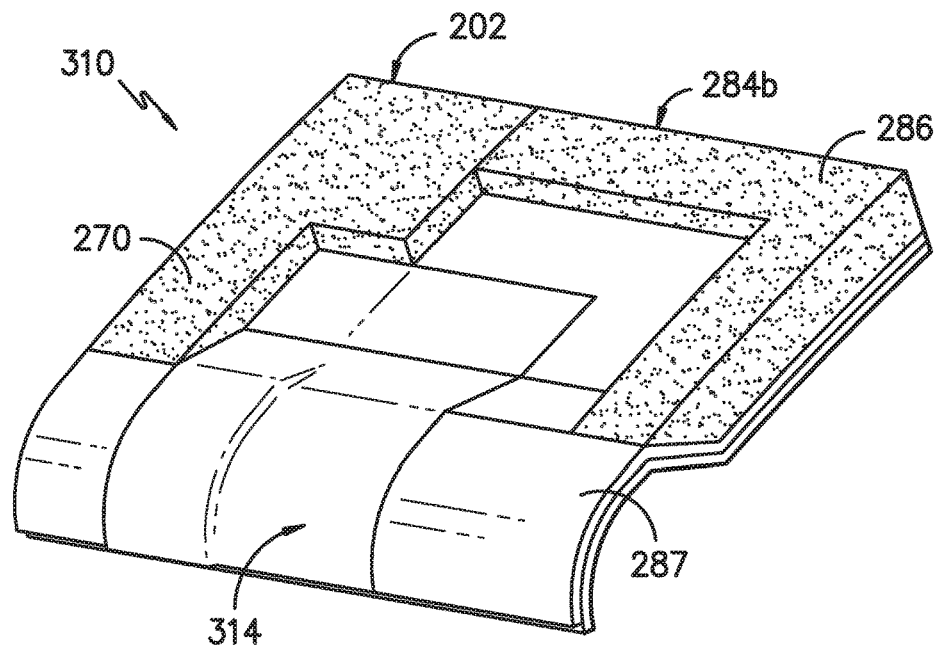
FIG. -39-
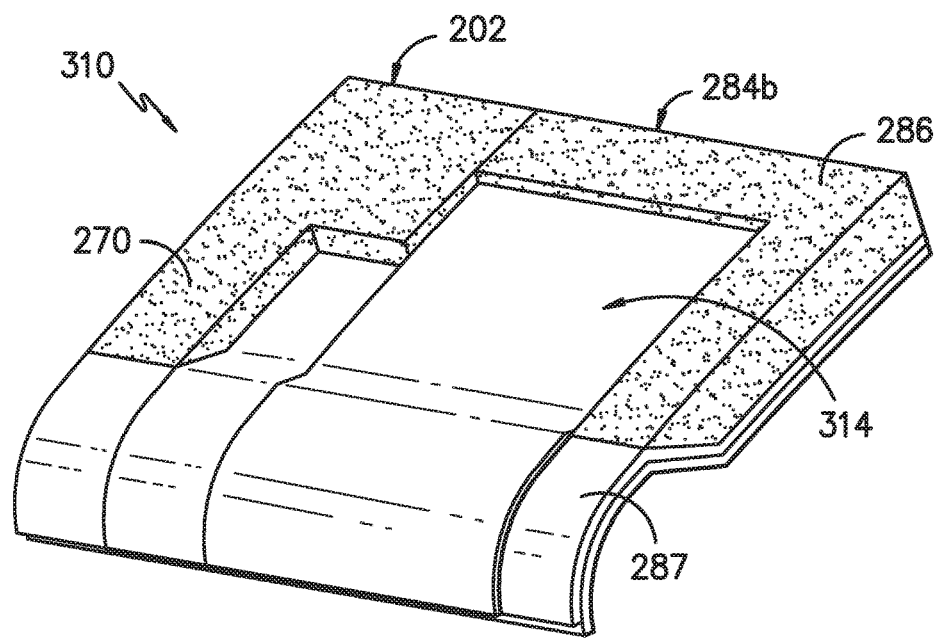
FIG. -40-

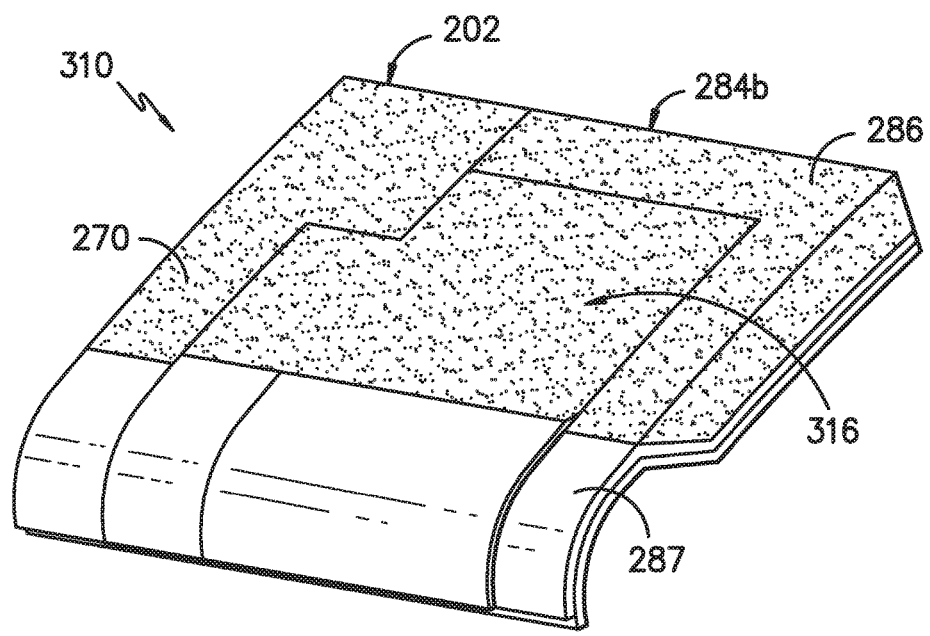
FIG. -41-
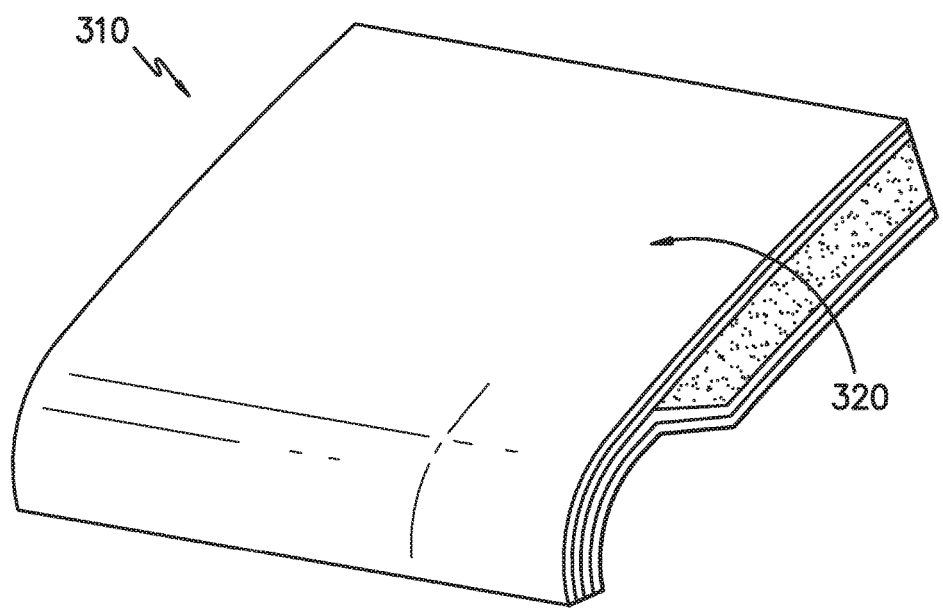
FIG. -42-

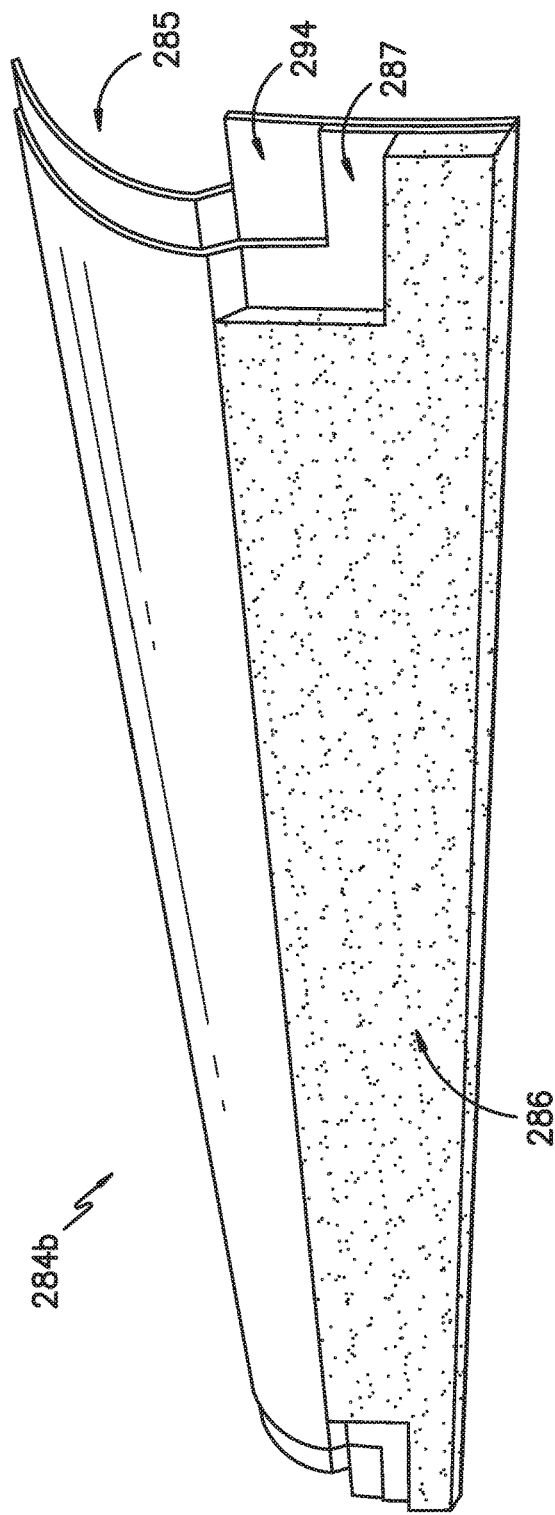
FIG. -43-

BONDED WINDOW COVER WITH JOINT ASSEMBLY FOR A WIND TURBINE ROTOR BLADE

FIELD OF THE INVENTION

The present subject matter relates generally to wind turbines and, more particularly, to a bonded window cover for an access window of a wind turbine rotor blade having a unique joint assembly.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more turbine rotor blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally known, the deflection of a rotor blade is a function of blade length, along with wind speed, turbine operating states and blade stiffness. Thus, longer rotor blades may be subject to increased deflection forces, particularly when a wind turbine is operating in high-speed wind conditions. These increased deflection forces not only produce fatigue on the rotor blades and other wind turbine components but may also increase the risk of the rotor blades striking the tower.

In order to increase the length of wind turbine rotor blades without adversely affecting the aerodynamic design, it is known to install tip extensions onto the blades. Typically, a conventional tip extension is installed onto a rotor blade by cutting-off a portion of the blade at its tip and replacing such cut-off portion with the tip extension. However, due to the fact that a portion of the rotor blade must be cut-off and because the elongated rotor blade will be subjected to increased loads, the tip extension must be significantly longer than the actual increase in rotor blade length that can be achieved by installing the extension. For example, a conventional tip extension may often need to have a length of almost half of the original span of the rotor blade to accommodate the increased loading on the blade. As such, due to their length, the costs of manufacturing and transporting conventional tip extensions can be prohibitively expensive.

To address the aforementioned issues, it is known in the art to provide blade inserts to increase the span of the rotor blades. For example, U.S. Pat. No. 9,297,357 filed on Apr. 4, 2013 entitled "Blade Insert for a Wind Turbine Rotor Blade," describes a blade insert configured to increase the span of a rotor blade by an amount generally corresponding to the overall length of the blade insert.

In addition, the '357 patent describes an access window defined between the insert and the blade segments to permit the ends of the blade insert to be secured to the joint end of each blade segment. Such access windows may generally allow for service workers to access the interior of the rotor blade, thereby allowing various components to be positioned within the rotor blade to facilitate securing the blade insert between the blade segments. Further, the access windows are covered by a window cover that is secured within the access window via a laminated connection.

Though the laminated connection sufficiently secures the window cover within the access window, it would be advantageous to bond the window covers in place (e.g. via a bonding agent). However, a bonded window cover, without a transition from two sets of inner skins to a single set of inner skins, would cause an undesirable bump at least at the leading edge of the rotor blade.

Accordingly, the present disclosure is directed to a bonded window cover and corresponding joint assembly that eliminates such an undesirable bump at the leading edge.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for assembling a rotor blade assembly having a blade insert and a first blade segment. The blade insert includes a top side extending between a forward edge and an aft edge and a bottom side extending between a forward edge and an aft edge. The method includes securing a forward end of the blade insert adjacent to a first joint end of the first blade segment, at least a portion of the forward edge of the top side being offset relative to the forward edge of the bottom side such that an access window is defined between the blade insert and the first blade segment. The method also includes positioning a window cover so as to cover at least a portion of the access window. Further, the method includes bonding, via a bonding agent, the window cover within the access window.

In one embodiment, the method may include forming one or more flanges around a periphery of the access window and prepping the one or more flanges before positioning the window cover.

In another embodiment, the method includes forming a joint assembly at one or more of the flanges of the access window. More specifically, in certain embodiments, the step of forming the joint assembly at one or more of the flanges of the access window may include placing a layer of the bonding agent atop a portion of one of the flanges of the access window, placing an edge of the window cover atop of the layer of the bonding agent, the edge of the window cover having a first region with a single-ply thickness and a second region with a double-ply thickness, placing a first fiber layer across the flange of the access window and the first region of the window cover, placing a second fiber layer atop, at least, the first fiber layer and the second region, and placing core material atop a portion of the second fiber layer, leaving a portion of the second fiber layer exposed.

In further embodiments, the method may include prepping the window cover before positioning the window cover so as to cover at least a portion of the access window. For example, in certain embodiments, the step of prepping the window cover may include removing a corner of the window cover, removing a portion of core material adjacent the removed corner of the window cover so as to form the second region with the double-ply thickness, and removing a portion of one or more inner skin layers of the window cover adjacent to the removed corner so as to form the first region with the single-ply thickness.

In additional embodiments, the step of prepping the window cover may include tapering at least one end of the window cover.

In several embodiments, the method may include removing at least one inner skin layer of a flange adjacent to a leading edge of the rotor blade assembly. In such embodiments, the step of positioning the window cover so as to cover at least a portion of the access window may include placing the removed corner of the window cover adjacent to the flange of the access window where at least one inner skin layer was removed.

In yet another embodiment, the method may include placing the second fiber layer atop the first fiber layer and the second region and another portion of one of the flanges of the access window.

In still further embodiments, the method may include sizing the window cover such that a peripheral gap exists between a perimeter of the window cover and the access window when the window cover is positioned in the access window.

In particular embodiments, the step of prepping the one or more flanges before positioning the window cover so as to cover at least a portion of the access window may include prepping a trailing edge flange of the access window by: removing at least one of an outer skin layer, a core material, or a fiber layer from a trailing edge of the first blade segment to create a trailing edge flange of the access window, bonding one or more inner skin layers between the blade insert and the first blade segment, scarfing the one or more inner skin layers to inner skins adjacent to the bonded one or more inner skin layers, and placing a core material atop the one or more inner skin layers so as to complete the trailing edge flange.

In additional embodiments, the step of prepping the one or more flanges before positioning the window cover so as to cover at least a portion of the access window may include prepping a leading edge flange of the access window by: forming a bond cap scarf connection at a leading edge of the rotor blade assembly between the blade insert and the first blade segment.

In another aspect, the present subject matter is directed to a rotor blade assembly for a wind turbine. The rotor blade assembly includes a first blade segment defining a first joint end, a second blade segment defining a second joint end, and a blade insert extending between a forward end coupled to the first blade segment and an aft end coupled to the second blade segment. The blade insert includes a top side and a bottom side. The top side extends between a forward edge and an aft edge and defines a top scarfed section at its forward edge. The bottom side extends between a forward edge and an aft edge and defines a bottom scarfed section at its forward edge. Further, at least a portion of the forward edge of the top side is offset relative to the forward edge of the bottom side such that an access window is defined between the top side and the first blade segment when the forward end of the blade insert is positioned adjacent to the first joint end of the first blade segment. The access window includes a flange that extends around a periphery thereof. As such, the rotor blade assembly also includes a window cover bonded to the flange via a bonding agent.

In yet another aspect, the present subject matter is directed to a rotor blade assembly for a wind turbine. The rotor blade assembly includes a first blade segment and a second blade segment arranged with the first blade segment at a joint. The rotor blade assembly also includes an access window defined within at least one of the first blade segment or the second blade segment. Further, the access window includes a flange that extends around a periphery thereof. The rotor blade assembly also includes a window cover bonded to the flange of the access window via a bonding agent and at least one joint assembly at an interface between the window cover and the access window. Thus, the joint assembly provides a transition from two sets of inner skin layers to one set of inner skin layers.

In one embodiment, the joint assembly is located at a leading edge of the rotor blade assembly. In another embodiment, the window cover at the interface may include a first region having a single-ply thickness, a second region having a double-ply thickness, and a removed corner adjacent to the flange of the first blade segment. In such embodiments, the flange of the access window at the interface may include a double-ply area and a single-ply area, with at least a portion of the double-ply area containing a bonding agent. Thus, the removed corner of the window cover exposes the single-ply area of the flange when the window cover is positioned to cover the access window.

In further embodiments, the joint assembly may include a first fiber layer positioned atop the flange of the access window and the first region having the single-ply thickness of the window cover, a second fiber layer positioned atop, at least, the first fiber layer and the second region having the double-ply thickness, and a core material positioned atop a portion of the second fiber layer, leaving a portion of the second fiber layer exposed.

In additional embodiments, the window cover may have a first end and a second end, with at least one of the first or second ends having a tapered cross-section. Thus, in such embodiments, the tapered cross-section of one of the first end or the second end may have a thickness that decreases towards at least one of a leading edge or a trailing edge of the rotor blade assembly. In addition, the tapered cross-section of another one of the first end or the second end may have a thickness that increases towards a spar cap of the rotor blade assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of one of the rotor blades of the wind turbine shown in FIG. 1;

FIG. 3 illustrates an exploded view of one embodiment of a rotor blade assembly according to the present disclosure;

FIG. 4 illustrates a perspective view of one embodiment of a suitable blade insert configuration that may be utilized with the disclosed rotor blade assembly according to the present disclosure;

FIG. 5 illustrates a cross-sectional view of the blade insert shown in FIG. 4 taken about line 5-5;

FIG. 6 illustrates a perspective view of one embodiment of a suitable blade segment configuration that may be utilized with the disclosed rotor blade assembly according to the present disclosure;

FIG. 7 illustrates an exploded view of a portion of one embodiment of the disclosed rotor blade assembly, particularly illustrating the rotor blade assembly including the blade insert shown in FIGS. 4 and 5 and the blade segment shown in FIG. 6;

FIG. 8 illustrates a perspective, assembled view of the components shown in FIG. 7;

FIG. 9 illustrates a cross-sectional view of a portion of the rotor blade assembly shown in FIG. 8 taken about line 9-9;

FIG. 10 illustrates a perspective view of another embodiment of a suitable blade insert configuration that may be utilized with the disclosed rotor blade assembly in accordance with aspects of the present subject matter;

FIG. 11 illustrates a cross-sectional view of a portion of the blade insert shown in FIG. 10 taken about line 11-11;

FIG. 12 illustrates a perspective view of another embodiment of a suitable blade segment configuration that may be utilized with the disclosed rotor blade assembly in accordance with aspects of the present subject matter;

FIG. 13 illustrates an exploded view of a portion of one embodiment of the disclosed rotor blade assembly, particularly illustrating the rotor blade assembly including the blade insert shown in FIGS. 10 and 11 and the blade segment shown in FIG. 12;

FIG. 14 illustrates a perspective, assembled view of the components shown in FIG. 13;

FIG. 15 illustrates a cross-sectional view of a portion of the rotor blade assembly shown in FIG. 14 taken about line 15-15;

FIG. 16 illustrates a flow diagram of one embodiment of a method for assembling a rotor blade assembly having a blade insert and a first blade segment according to the present disclosure;

FIG. 17 illustrates a top view of one embodiment of the rotor blade assembly according to the present disclosure, particularly illustrating the flanges being formed in the access windows thereof;

FIG. 18 illustrates a top view of one embodiment of the rotor blade assembly according to the present disclosure, particularly illustrating the leading and trailing edge flanges being formed;

FIG. 19 illustrates a top view of one embodiment of the rotor blade assembly according to the present disclosure, particularly illustrating the trailing edge inner skins being placed at the trailing edge thereof;

FIG. 20 illustrates a top view of one embodiment of the rotor blade assembly according to the present disclosure, particularly illustrating the trailing edge inner skin plies being placed at the trailing edge thereof;

FIG. 21 illustrates a top view of one embodiment of the rotor blade assembly according to the present disclosure, particularly illustrating core material being placed at the trailing edge thereof;

FIG. 22 illustrates a top view of one embodiment of the rotor blade assembly according to the present disclosure, particularly illustrating the window covers being placed within the access windows thereof;

FIG. 23 illustrates a cross-sectional view of one embodiment of an interface of the window cover and the spar cap according to the present disclosure;

FIG. 24 illustrates a cross-sectional view of one embodiment of an interface of the window cover and the spar cap of the rotor blade assembly according to the present disclosure;

FIG. 25 illustrates a top view of one embodiment of the rotor blade assembly, particularly illustrating locations for the joint assemblies according to the present disclosure;

FIG. 26 illustrates a top view of one embodiment of the rotor blade assembly according to the present disclosure, particularly illustrating a complete rotor blade assembly with outer skin layers covering the joint assemblies;

FIG. 27 illustrates a partial, cross-sectional view of one embodiment of a bonded window cover without a joint assembly according to the present disclosure, particularly illustrating the undesirable bump created thereby;

FIG. 28 illustrates a partial, cross-sectional view of one embodiment of a bonded window cover with a joint assembly according to the present disclosure;

FIG. 29 illustrates a partial, top view of one embodiment of the flange of the access window, particularly illustrating the ply thicknesses thereof as a step in the formation of the joint assembly according to the present disclosure;

FIG. 30 illustrates a partial, top view of one embodiment of the flange of the access window, particularly illustrating a bonding agent applied thereto as a step in the formation of the joint assembly according to the present disclosure;

FIG. 31 illustrates a partial, top view of one embodiment of the window cover secured to the flange of the access window, particularly illustrating a bond paste being added as a step in the formation of the joint assembly according to the present disclosure;

FIG. 32 illustrates a partial, top view of one embodiment of the window cover secured to the flange of the access window, particularly illustrating the bond paste in place as a step in the formation of the joint assembly according to the present disclosure;

FIG. 33 illustrates a partial, top view of one embodiment of the window cover secured to the flange of the access window, particularly illustrating a first fiber layer applied atop the bond paste as a step in the formation of the joint assembly according to the present disclosure;

FIG. 34 illustrates a partial, top view of another embodiment of the window cover secured to the flange of the access window, particularly illustrating a second fiber layer applied atop the first fiber layer as a step in the formation of the joint assembly according to the present disclosure;

FIG. 35 illustrates a partial, top view of the window cover secured to the flange of the access window, particularly illustrating a core material applied atop the second fiber layer as a step in the formation of the joint assembly according to the present disclosure;

FIG. 36 illustrates a partial, top view of the window cover secured to the flange of the access window, particularly outer skin layers placed atop the core material as a step in the formation of the joint assembly according to the present disclosure; and FIG. 37 illustrates a partial, top view of another embodiment of the window cover secured to the flange of the access window, particularly illustrating the joint assembly according to the present disclosure;

FIG. 38 illustrates a partial, top view of another embodiment of the window cover secured to the flange of the access window, particularly illustrating a bond paste in place as a step in the formation of the joint assembly according to the present disclosure;

FIG. 39 illustrates a partial, top view of another embodiment of the window cover secured to the flange of the access window, particularly illustrating a first fiber layer applied atop the bond paste as a step in the formation of the joint assembly according to the present disclosure;

FIG. 40 illustrates a partial, top view of yet another embodiment of the window cover secured to the flange of the access window, particularly illustrating a second fiber layer applied atop the bond paste as a step in the formation of the joint assembly according to the present disclosure;

FIG. 41 illustrates a partial, top view of the window cover secured to the flange of the access window, particularly illustrating a core material applied atop the second fiber layer as a step in the formation of the joint assembly according to the present disclosure;

FIG. 42 illustrates a partial, top view of the window cover secured to the flange of the access window, particularly illustrating outer skin layers placed atop the core material as a step in the formation of the joint assembly according to the present disclosure; and FIG. 43 illustrates a perspective view of one embodiment of a window cover according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a bonded window cover for an access window of a rotor blade assembly having a unique joint assembly. For example, for rotor blade assembly having blade inserts that form access windows with the rotor blade segments, the laminated in window covers are replaced with bonded windows. More specifically, the bonded-in window covers are bonded in with a window frame lap joint, which allows the transition from two sets of inner skin layers (bonded onto one another) to one set of inner skin layers. Without this transition, the leading edge would have an undesirable bump or protrusion as well as waves in the skin layers. In addition, in certain instances, the window cover may be tapered to improve bond gap control and minimize additional machining of the cover.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 26 disposed opposite the blade root 24. A body 28 of the rotor blade 22 may generally be configured to extend between the blade root 24 and the blade tip 26 and may serve as the outer casing/skin of the blade 22. In several embodiments, the body 28 may define a substantially aerodynamic profile, such as by defining a symmetrical or cambered airfoil-shaped cross-section. As such, the body 28 may include a pressure side 30 and a suction side 32 extending between a leading edge 34 and a trailing edge 36. Further, the rotor blade 22 may have a span 38 defining the total length between the blade root 22 and the blade tip 24 and a chord 40 defining the total length between the leading edge 34 and the trialing edge 36. As is generally understood, the chord 40 may vary in length with respect to the span 38 as the rotor blade 22 extends from the blade root 22 to the blade tip 24.

In several embodiments, the body 28 of the rotor blade 22 may be formed as a single, unitary component. Alternatively, the body 28 may be formed from a plurality of shell components. For example, the body 28 may be manufactured from a first shell half generally defining the pressure side 30 of the rotor blade 22 and a second shell half generally defining the suction side 32 of the rotor blade 20, with the shell halves being secured to one another at the leading and trailing edges 34, 36 of the blade 22. Additionally, the body 28 may generally be formed from any suitable material. For instance, in one embodiment, the body 28 may be formed entirely from a laminate composite material, such as a carbon fiber reinforced laminate composite or a glass fiber reinforced laminate composite. Alternatively, one or more portions of the body 28 may be configured as a layered construction and may include a core material 42 (e.g., as shown in FIG. 6), formed from a lightweight material such as wood (e.g., balsa), foam (e.g., extruded polystyrene foam) or a combination of such materials, disposed between layers of laminate composite material.

It should be appreciated that the rotor blade 22 may also include one or more longitudinally extending structural components configured to provide increased stiffness, buckling resistance and/or strength to the rotor blade 22. For example, in several embodiments, the rotor blade 22 may include a pair of spar caps (e.g., a top spar cap 44 and a bottom spar cap 46) and one or more shear webs 48 extending between the opposed spar caps 44, 46 (e.g., as shown in FIG. 6).

Referring now to FIG. 3, one embodiment of a rotor blade assembly 100 is illustrated in accordance with aspects of the present subject matter. As shown, the rotor blade assembly 100 may include a first blade segment 102 (or 202), a second blade segment 104 (or 204) and a blade insert 106 (or 206) configured to be coupled between the first and second blade segments 102, 104. In general, the rotor blade assembly 100 may be configured such that, when the first and second blade segments 102, 104 are coupled together via the blade insert 106, a complete rotor blade is formed.

In several embodiments, the first and second blade segments 102, 104 may be formed by dividing a pre-existing rotor blade 22 into two separate blade sections. For example, as shown in FIG. 2, in one embodiment, the illustrated rotor blade 22 may be divided into the first and second blade segments 102, 104 by cutting the rotor blade 22 along a joint or cut line 108. Thus, in the illustrated embodiment, the first blade segment 102 may correspond to a root segment of the rotor blade 22 and may extend between the blade root 24 and a first joint end 110 formed at the cut line 108. Similarly, in the illustrated embodiment, the second blade segment 104 may correspond a tip segment of the rotor blade 22 and may extend between the blade tip 26 and a second joint end 112 formed at the cut line 108.

It should be appreciated that, although the first blade segment 102 is shown as a root segment and the second blade segment 104 is shown as a tip segment, the terms "first blade segment" and "second blade segment" may generally refer to any suitable segments or sections of the rotor blade 22. For example, in another embodiment, the first blade segment 102 may correspond to a tip segment of the rotor blade 22 and the second blade segment 104 may correspond to a root segment of the rotor blade 22. In a further embodiment, the first and second blade segments 102, 104 may correspond to shorter segments of the rotor blade 22.

Additionally, it should be appreciated that, as used herein, the terms "first blade segment" and "second blade segment" need not be limited to a single, continuous blade segment. For example, in the illustrated embodiment, the first blade segment 102 may be formed from a single, unitary blade segment extending between the blade root 24 and the first joint end 110 or the first blade segment 102 may be formed from two or more blade segments that, when coupled together, extend between blade root 24 and the first joint end 110. Similarly, in the illustrated embodiment, the second blade segment 104 may be formed from a single, unitary blade segment extending between the second joint end 112 and the blade tip 26 or the second blade segment 104 may be formed from two or more blade segments that, when coupled together, extend between the second joint end 112 and the blade tip 26.

Moreover, it should be appreciated that the cut line 108 (FIG. 2) may generally be located at any suitable position along the span 38 of the rotor blade 22. For example, in one embodiment, the distance of the cut line 108 from the blade root 24 may range from about 40% to about 95% of the span 38, such as from about 40% to about 80% of the span 28 or from about 50% to about 65% of the span 38. However, it is foreseeable that, in other embodiments, the distance of the cut line 108 from the blade root 34 may be less than 40% of the span 38 or greater than 95% of the span 38.

It should also be appreciated that, in alternative embodiments, the first and second blade segments 102, 104 need not be formed by cutting or otherwise dividing a pre-existing rotor blade 22 into two separate blade sections. For example, in another embodiment, the first and second blade segments 102, 104 may be separately manufactured and assembled together with the blade insert 106 to form the disclosed rotor blade assembly 100.

Referring still to FIG. 3, the blade insert 106 of the rotor blade assembly 100 may generally comprise an elongated, aerodynamic body 114 extending between a forward end 116 and an aft end 118, thereby forming a separate blade segment of the rotor blade assembly 100. In general, the blade insert 106 may be configured to be coupled between the first and second blade segments 102, 104 in order to form the rotor blade assembly 100. Specifically, the forward end 116 of the blade insert 106 may be configured to be coupled to the joint end 110 of the first blade segment 102 and the aft end 118 of the blade insert 106 may be configured to be coupled to the joint end 112 of the second blade segment 104. Suitable configurations and methods for attaching the blade insert 106 (or 206) between the first and second blade segments 102, 104 (or 202, 204) will generally be described below with reference to FIGS. 4-15.

Referring now to FIGS. 4-6, one embodiment of a particular blade insert/segment configuration that may be used to effectively and efficiently secure a blade insert 106 between first and second blade segments 102, 104 of a rotor blade assembly 100 is illustrated in accordance with aspects of the present subject matter. Specifically, FIG. 4 illustrates a perspective view of the blade insert 106 and FIG. 5 illustrates a cross-sectional view of the blade insert 106 taken about line 6-6. Additionally, FIG. 6 illustrates a perspective view of a corresponding configuration that may be used for the first blade segment 102 and/or the second blade segment 104.

As indicated above, the blade insert 106 may generally include an elongated body 114 extending spanwise between a forward end 116 and an aft end 118, with the forward end 116 configured to be coupled to the joint end 110 of the first blade segment 102 and the aft end 118 being configured to be coupled to the joint end 112 of the second blade segment 104. In general, the body 114 may be configured to define a substantially aerodynamic profile, such as by defining a symmetric or cambered airfoil-shaped cross-section. Thus, as shown in FIGS. 4 and 5, the body 114 may include a top side 120 (e.g., a pressure side) and a bottom side 122 (e.g., suction side) extending between a leading edge 124 and a trailing edge 126. Additionally, as shown, the top side 120 of the body 114 may be configured to extend spanwise between a forward edge 128 disposed at the forward end 116 of the blade insert 106) and an aft edge 130 disposed at the aft end 118 of the blade insert 106. Similarly, the bottom side 122 of the body 114 may be configured to extend spanwise between a forward edge 132 (disposed at the forward end 116 of the blade insert 106 and an aft edge 134 disposed at the aft end 118 of the blade insert 106.

In several embodiments, at least a portion of the forward and aft edges 128, 130 of the top side 120 of the blade insert 106 may be recessed or offset from the forward and aft edges 132, 134 respectively, of the bottom side 122 of the blade insert 106. For example, as shown in the illustrated embodiment, the forward edge 128 of the top side 120 may be inwardly offset or recessed (i.e., in the direction of the aft end 118 of the blade insert 106) from the forward edge 132 of the bottom side 122 by a first spanwise distance 136. Similarly, the aft edge 130 of the top side 120 may be inwardly offset or recessed (i.e., in the direction of the forward end 116 of the blade insert 106) from the aft edge 134 of the bottom side 122 by a second spanwise distance 138. As will be described below, by offsetting the edges 128, 130, 132, 134 of the top and bottom sides 120, 122 as shown in FIGS. 4 and 5, one or more access windows 140 (FIG. 7) may be defined at the forward and aft ends 116, 118 of the blade insert 106 when the insert 106 is positioned between the first and second blade segments 102, 104. Such access windows 140 may generally allow for service workers to access the interior of the rotor blade assembly 100, thereby allowing various components to be positioned within the rotor blade assembly 100 to facilitate securing the blade insert 106 between the blade segments 102, 104.

It should be appreciated that the first and second spanwise distances 136, 138 may generally correspond to any suitable distance. Additionally, in one embodiment, the first spanwise distance 136 may be equal to the second spanwise distance 138. Alternatively, the first spanwise distance 136 may be greater or less than the second spanwise distance 138.

It should also be appreciated that, as used herein, the terms "forward" and "aft" are simply used to distinguish the opposed ends 110, 112 and/or edges 128, 130, 132, 134 of the blade insert 106. Thus, although the forward end 110 of the blade insert 106 is described herein as being configured to be coupled to the joint end 110 of the first blade segment 102, the aft end 112 of the blade insert 106 may instead be configured to be coupled to the first blade segment 102. Similarly, as used herein, the terms "top" and "bottom" are simply used to distinguish the opposed sides 120, 122 of the blade insert 106. For example, in the illustrated embodiment, the top side 120 of the blade insert 106 corresponds to the pressure side while the bottom side 122 corresponds to the suction side. However, in another embodiment, the top side 120 of the blade insert 106 may correspond to the suction side while the bottom side 122 may correspond to the pressure side.

Additionally, in several embodiments, the blade insert 106 may include the same or similar internal structural components as the first and second blade segments 102, 104. For example, as shown in FIG. 4, the blade insert 106 may include a pair of longitudinally extending spar caps (e.g., a top spar cap 142 and a bottom spar cap 144), with each spar cap 142, 144 being integrated into and/or forming part of either the top side 120 or the bottom side 122 of the blade insert 106. In addition, the blade insert 106 may include one or more shear webs 146 extending between the opposed spar caps 142, 144. For example, as shown in FIG. 5, in one embodiment, the shear web 146 may be configured to extend lengthwise between a first end 148 and a second end 150, with the first end 148 generally being aligned with the forward edge 128 of the top side 120 of the blade insert 106 and the second end 106 generally being aligned with the aft end 130 of the top side 120.

Moreover, in several embodiments, one or more tapered or scarfed sections may be defined along the top and bottom sides 120, 122 of the blade insert 106. For example, as shown in FIGS. 4 and 5, first and second top scarfed sections 152, 154 may be defined along the outer surface of the top side 120, with the first top scarfed section 152 extending lengthwise from an inner edge 156 to the forward edge 128 of the top side 120 and the second top scarfed section 154 extending from an inner edge 158 to the aft edge 130 of the top side 120. Similarly, as shown in FIGS. 4 and 5, first and second bottom scarfed sections 160, 162 may be defined along the inner surface of the bottom side 122, with the first bottom scarfed section 160 extending from an inner edge 164 to the forward edge 132 of the bottom side 122 and the second bottom scarfed section 162 extending from an inner edge 166 (FIG. 5) to the aft edge 134 of the bottom side 122. In such an embodiment, each scarfed section 152, 154, 160, 162 may be configured to taper outwardly from its inner edge 156, 158, 164, 166 (i.e., with the height of each scarfed section 152, 154, 160, 162 increasing from its inner edge 156, 158, 164, 166 to the respective forward or aft edges 128, 130, 132, 134 of the top or bottom sides 120, 122 of the blade insert 106).

It should be appreciated that the scarfed sections 152, 154, 160, 162 may generally be defined at any suitable chordwise location along the top and bottom sides 120, 122 of the blade insert 106. However, in several embodiments, the scarfed sections 152, 154, 160, 162 may be aligned with the spar caps 142, 144 of the blade insert 106. For example, as shown in FIG. 4, the top scarfed sections 152, 154 are generally aligned with the top spar cap 142 while the bottom scarfed sections 160, 162 are generally aligned with the bottom spar cap 144. In such an embodiment, a width 168 of each scarfed section 152, 154, 160, 162 may generally correspond to the width of the spar caps 142, 144. Alternatively, the width 168 of each scarfed section 152, 154, 160, 162 may be greater or less than the width of the spar caps 142, 144.

Additionally, it should be appreciated that each scarfed section 152, 154, 160, 162 may generally be configured to extend any suitable length 170 between its edges. For example, as shown in FIGS. 4 and 5, in one embodiment, the length 170 of the bottom scarfed sections 160, 162 may be selected so that the inner edges 164, 166 of such scarfed sections 160, 162 are disposed adjacent to ends 148, 150 of the shear web 146 (i.e., so as to be vertically aligned with the forward and aft edges 128, 130 of the top side 120 of the blade insert 106). However, in other embodiments, the inner edges 164, 166 of the bottom scarfed sections 160, 162 may be spaced apart from the end 148, 150 of the shear web 146 (and/or the edges 128, 130 of the tip side 120).

Moreover, in several embodiments, a portion of the shell(s) forming the blade insert 10 may be recessed relative to the forward and aft edges 128, 130, 132, 134 of the top and bottom sides 120, 122. For example, as shown in FIG. 4, only an inner layer of the top side shell (e.g., one or more layers of laminate composite) may extend to the forward and aft edges 128, 130 of the top side 120 while only an outer layer of the bottom side shell (e.g., one or more layers of laminate composite) may extend to the forward and aft edges 132, 134 of the bottom side 122, thereby defining top and bottom flanges 172, 174 extending across portions of such edges 128, 130, 132, 134. As will be described below, after aligning the blade insert 106 between the first and/or second blade segments 102, 104, the outer layers of the shell(s) (e.g., one or more outer layers of laminate composite and/or one or more layers of core material 42) may then be positioned onto the top and the bottom flanges 172, 174 to fill the voids defined by the flanges 172, 174.

Referring now to FIG. 6, a perspective view of a suitable segment configuration for attaching each blade segment 102, 104 to the blade insert 106 shown in FIGS. 4 and 5 is illustrated in accordance with aspects of the present subject matter. Specifically, FIG. 6 illustrates a perspective view of the joint end 110 of the first blade segment 102. However, it should be appreciated that the joint end 112 of the second blade segment 104 may be configured the same as or similar to the joint end 110 shown in FIG. 6.

As shown, the blade segment 102 may be modified to include scarfed sections 175, 176 configured to be aligned with the scarfed sections 152, 160 of the blade insert 106. Specifically, in the illustrated embodiment, the blade segment includes a top scarfed section 175 defined along the outer surface of its pressure side 30 that is configured to be aligned with the top scarfed section 152 defined at the forward edge 128 of the top side 120 of the blade insert 106. Similarly, the blade segment includes a bottom scarfed section 176 defined along the inner surface of its suction side 32 that is configured to be aligned with the bottom scarfed section 160 defined at the forward edge 132 of the bottom side 122 of the blade insert 106. As will be described below, suitable scarfed connectors may be positioned across the aligned scarfed sections 152, 160, 175, 176 to provide a means for securing the blade segment 102 to the blade insert 106.

Additionally, similar to the blade insert 106, the blade segment 102 may include an edge 177 at its joint end 110 that is offset from the edge of the opposing side of the blade segment 102 by a given spanwise distance 178. Specifically, in the illustrated embodiment, a portion of the shell may be removed along the pressure side 30 between the joint end 110 and the top scarfed section 175, thereby creating the offset edge 177. As will be described below, this removed portion of the shell may form part of the access window 140 when the blade segment 102 and the blade insert 106 are positioned adjacent to one another.

Moreover, as shown in FIG. 6, a portion of the shell(s) forming the pressure and suction sides 30, 32 of the blade segment 102 may be recessed relative to the joint end 110 of the blade segment 102. For example, similar to the blade insert 106, only an inner layer of the shell(s) (e.g., one or more layers of laminate composite) may be configured to extend to the joint end 110 of the blade segment 102, thereby defining top and bottom flanges 179, 180 around portions of the perimeter of the joint end 110.

Referring now to FIGS. 7-9, several assembly views of the blade insert 106 shown in FIGS. 4 and 5 and the blade segment 102 shown in FIG. 6 are illustrated in accordance with aspects of the present subject matter. Specifically, FIG. 7 illustrates a perspective view of the blade insert 106 and the blade segment 102 positioned end-to-end, with suitable components for securing the blade insert 106 to the blade segment 102 being exploded outward. FIG. 8 illustrates a perspective, assembled view of the blade insert 106, the blade segment 102 and the various components shown in FIG. 7 and FIG. 9 illustrates a cross-sectional view of the rotor blade assembly 100 shown in FIG. 8 taken about line 9-9.

As shown in FIG. 7, when the blade insert 106 and the blade segment 102 are positioned end-to-end, an access window 140 may be defined between such components. This access window 140 may generally allow a service worker(s) to access the interior of the rotor blade assembly 100, thereby facilitating installation of many of the assembly components shown in FIG. 7. For example, in one embodiment, a bottom scarfed connector 181, bottom shell inserts 182 and a shear web insert 183 may be installed within the rotor blade assembly 100 via the access provided by the access window 140. Thereafter, the access window 140 may be covered by a suitable window cover 184 to allow the assembly process to be finalized.

As indicated above, when the blade insert 106 and the blade segment 102 are positioned end-to-end, the bottom scarfed section 160 at the forward end 116 of the blade insert 106 may be configured to be aligned with the bottom scarfed section 176 of the blade segment 102. Specifically, as shown in FIG. 9, the aligned bottom scarfed sections 160, 176 may be configured to abut one another when the blade insert 106 and blade segment 102 are positioned together. In such an embodiment, a bottom scarfed connector 181 may be positioned across the bottom scarfed sections 160, 176 in order to facilitate coupling the blade insert 106 to the blade segment 102. Specifically, as shown in FIGS. 7 and 9, the bottom scarfed connector 181 may generally define a tapered profile corresponding to the tapered profiles defined by the bottom scarfed sections 160, 176. Thus, as shown in FIG. 9, the bottom scarfed connector 181 may be configured to extend across the interface defined between the blade segment 102 and the blade insert 106 so as to fill the open area defined by the bottom scarfed sections 160, 176.

In several embodiments, the bottom scarfed connector 181 may comprise a pre-fabricated component configured to be separately installed within the rotor blade assembly 100 (via the access window 140) and secured across the aligned bottom scarfed sections 160, 176, such as by securing the scarfed connector 181 within the bottom scarfed sections 160, 176 using suitable adhesives and/or mechanical fasteners (e.g., bolts, screws, pins, rivets, brackets and/or the like).

Alternatively, the bottom scarfed connector 181 may be formed or otherwise built-up within the aligned bottom scarfed sections 160, 176. For instance, in one embodiment, the scarfed connector 181 may be formed using a wet lay-up process, wherein a plurality of plies (including a reinforcement material such as glass or carbon fibers) are positioned across and/or within the bottom scarfed sections 160, 176 and a resin or other suitable matrix material is rolled over or otherwise applied to the surface of the plies and allowed to cure.

In addition to the bottom scarfed sections 160, 176, the bottom flanges 174, 180 of the blade insert 106 and the blade segment 102 may also be configured to abut one another when the blade insert 106 is positioned end-to-end with the blade segment 102. As such, suitable bottom shell inserts 182 may be secured across the bottom flanges 174, 180 along either side of the bottom scarfed connector 181 to further secure the blade insert 106 and the blade segment 102 to one another Specifically, the bottom shell inserts 182 may generally configured to extend across the interface defined between the blade segment 102 and the blade insert 106 so as to fill the open area defined by bottom flanges 174, 180. For example, as shown in FIG. 7, the bottom shell inserts 182 may generally define a profile matching the profile of the corresponding portions of the shells for the blade insert 106 and the blade segment 102 and may also be formed from the same material (e.g., one or more layers of laminate component and/or one or more layers of core material 44). It should be appreciated that, similar to the bottom scarfed connector 181, the bottom shell inserts 182 may be pre-fabricated components or may be formed or otherwise built-up within the open area defined by the bottom flanges 174, 180.

As indicated above, a shear web insert 183 may also be installed within the rotor blade assembly 100 via the access window 140. In general, the shear web insert 183 may be configured to extend spanwise across between the terminating ends of the shear webs 48, 146 for the blade segment 102 and the blade insert 106. Specifically, as shown in FIG. 98, the shear web insert 183 may be configured to a define a length 185 generally corresponding to the length defined between the end of shear web 48 for the blade segment 102 and the end of the shear web 146 for the blade insert 106. As such, the shear web insert 183 may be installed within the rotor blade assembly 100 via the access window 140 and subsequently secured end-to-end between the shear webs 48, 146 (e.g., using a suitable adhesive(s) and/or a suitable mechanical fastener(s)).

Referring still to FIGS. 7-9, the rotor blade assembly 100 may also include a window cover 184 configured to extend across and/or cover at least a portion of the access window 140. Specifically, in several embodiments, the window cover 184 may be configured to define a shape generally corresponding to the shape of the access window 140. For example, as shown in FIG. 7, the window cover 184 may include a central portion 186 configured to be positioned over the shear web insert 183 so as to extend across the portion of the access window 140 defined between the aligned top scarfed sections 152, 175 of the blade insert 106 and the blade segment 102. Additionally, the window cover 184 may include side portions 187 configured to extend across the portions of the access window 140 extending down to the leading and trailing edges of the rotor blade assembly 100. As shown in FIG. 7, the side portions 187 of the window cover 184 may have a similar construction to that of the shells used to form the blade insert 106 and the blade segment 102. For example, the side portions 187 may be formed from a layered construction, including one or more layers of laminate material and/or one or more layers of core material 42.

Moreover, the rotor blade assembly 100 may also include a top scarfed connector 190 configured to be secured across the aligned top scarfed sections 152, 175 of the blade insert 106 and the blade segment 102. As shown in FIG. 7, the top scarfed connector 190 may include end sections 191 generally defining tapered profiles corresponding to the tapered profiles defined by the top scarfed sections 152, 175. Additionally, the top scarfed connector 190 may include a central section 192 generally defining a uniform profile. Thus, as shown in FIG. 9, when the top scarfed connector 190 is installed between the blade insert 106 and the blade segment 102, the central section 192 may extend across the central portion 186 of the window cover 184 while the end sections 191 may generally extend within and fill the area defined by the top scarfed sections 152, 175.

It should be appreciated that, similar to the bottom scarfed connector 181 and the bottom shell inserts 182, the top scarfed connector 190 may be pre-fabricated components or may be formed or otherwise built-up during assembly of the rotor blade assembly 100.

It should also be appreciated that, after the various components of the rotor blade assembly 100 have been assembled between the blade segment 102 and the blade insert 106, an overlaminate may be applied around the outer surface of the assembly 100 to ensure a smooth aerodynamic transition between the blade segment 102 and the blade insert 106. For example, the overlaminate may be applied using a wet lay-up process, wherein one or more plies (including a reinforcement material such as glass or carbon fibers) are positioned along the outer surface and a resin or other suitable matrix material is rolled over or otherwise applied to the surface of the plies to form a smooth profile.

Additionally, it should be appreciated that, although the blade insert 106 was described with reference to FIGS. 7-9 as simply being secured to one of the blade segments (e.g., the first blade segment 102), the same or a similar methodology, as well as the same or similar components, may be used to secure the blade insert 106 to the other blade segment (e.g., the second blade segment 104). For example, a bottom scarfed connector 181, bottom shell inserts 182, a shear web insert 183, a window cover 184, and a top scarfed connector 190 may be installed between the aft end 118 the blade insert 106 and the joint end 112 of the second blade segment 104 to allow such components to be secured to another in the same manner as the blade insert 106 and the first blade segment 102 (i.e., as shown in FIGS. 7-9).

Referring now to FIGS. 10-12, another embodiment of a particular blade insert/segment configuration that may be used to effectively and efficiently secure a blade insert 206 between first and second blade segments 202, 204 of a rotor blade assembly 100 is illustrated in accordance with aspects of the present subject matter. Specifically, FIG. 10 illustrates a perspective view of the blade insert 206 and FIG. 11 illustrates a partial, cross-sectional view of the blade insert 206 shown in FIG. 10 taken about line 11-11. Additionally, FIG. 12 illustrates a perspective view of a corresponding configuration that may be used for the first blade segment 202 and/or the second blade segment 204.

As shown in FIGS. 10 and 11, the blade insert 206 may be configured similarly to the blade insert 106 described above with reference to FIGS. 4 and 5. For example, the blade insert 206 may include an elongated body 214 extending spanwise between a forward end 216 and an aft end 218, with the forward end 216 being configured to be coupled to the joint end 110 of the first blade segment 202 and the aft end 218 being configured to be coupled to the joint end 112 of the second blade segment 204. The body 214 may generally be configured to define a substantially aerodynamic profile. Thus, as shown in FIGS. 10 and 11, the body 214 may include a top side 220 (e.g., a pressure side) and a bottom side 222 (e.g., suction side) extending between a leading edge 224 and a trailing edge 226. The top side 220 of the body 214 may be configured to extend spanwise between a forward edge 228 (disposed at the forward end 216 of the blade insert 206) and an aft edge 230 (disposed at the aft end 218 of the blade insert 206). Similarly, the bottom side 222 of the body 214 may be configured to extend spanwise between a forward edge 232 (disposed at the forward end 216 of the blade insert 206) and an aft edge 234 (disposed at the aft end 218 of the blade insert 2106). The blade insert 206 may also include the same or similar internal structural components as the first and second blade segments 202, 204, such as a pair of longitudinally extending spar caps (e.g., a top spar cap 242 and a bottom spar cap 244) and one or more shear webs 246 extending between the opposed spar caps 242, 244.

Additionally, similar to the blade insert 106 described above, a portion of the top side 220 of the blade insert 206 may be recessed or offset from the forward and aft edges 232, 234 of the bottom side 222 of the blade insert 206. For example, as shown in FIG. 10, portions of the top side 220 may be inwardly offset from the forward edge 232 of the bottom side 222 by a given spanwise distance 236 along either side of the top spar cap 242, thereby defining separate offset portions of the forward edge 228 of the top side 220. Similarly, portions of the top side 220 may also be inwardly offset from the aft edge 234 of the bottom side 222 by a given spanwise distance 238 along either side of the top spar cap 242, thereby defining separate offset portions of the aft edge 230 of the top side 220. As will be described below, by offsetting portions of the top side 220 as shown in FIG. 10, separate access windows 240, 241 may be defined at each end 216, 218 of the blade insert 206 when the insert 206 is positioned between the first and second blade segments 202, 204. Such access windows 240, 241 may generally allow for service workers to access the interior of the rotor blade assembly 100, thereby allowing various components to be positioned within the assembly 100 to facilitate securing the blade insert 206 between the blade segments 202, 204.

However, unlike the embodiment described above with reference to FIGS. 4 and 5, a portion(s) of the top side 220 of the blade insert 206 may also be configured to extend beyond the forward and aft edges 232, 234 of the bottom side 222 of the blade insert 206. Specifically, as shown in FIGS. 10 and 11, elongated portions 247 of the top side 220 (generally aligned with the top spar cap 242) may extend beyond the forward and aft edges 232, 234 of the bottom side 222, thereby defining extended portions of the forward and aft edges 228, 230 of the top side 220. As will be described below, such elongated portions 247 of the top side 220 may be configured to extend to a location at and/or adjacent to the joint ends 110, 112 of the blade segments 202, 204 when the blade insert 206 is positioned between the blade segments 202, 204.

Moreover, in several embodiments, one or more tapered or scarfed sections may be defined along the top and bottom sides 220, 222 of the blade insert 206. For example, as shown in FIG. 10, first and second top scarfed sections 252, 254 may be defined along the outer surface of the top side 220, with the first top scarfed section 252 extending from an inner edge 256 to the forward edge 228 of the elongated portion 247 of the top side 220 and the second top scarfed section 254 extending from an inner edge 258 to the aft edge 230 of the elongated portion 247 of the top side 220. Similarly, as shown in FIG. 10, first and second bottom scarfed sections 260, 262 may be defined along the inner surface of the bottom side 222, with the first bottom scarfed section 260 extending from an inner edge 264 to the forward edge 232 of the bottom side 222 and the second top scarfed section 262 extending from an inner edge (not shown) to the aft edge 234 of the bottom side 222. In such an embodiment, each scarfed section 252, 254, 260, 262 may be configured to taper outwardly from its inner edge 256, 258, 264 (i.e., with the height of each scarfed section 252, 254, 260, 262 increasing from its inner edge 256, 258, 264 to the respective forward or aft edges 228, 230, 232, 234 of the top and bottom sides 220, 222 of the blade insert 206).

Additionally, similar to the blade insert 106 described above, a portion of the shell(s) forming blade insert 206 may be recessed relative to the forward and aft edges 228, 230, 232, 234 of the top and bottom sides 220, 222. For example, as shown in FIG. 10, only an inner layer of the top side shell (e.g., one or more layers of laminate composite) may extend to the forward and aft edges 228, 230 of the top side 220 while only an outer layer of the bottom side shell (e.g., one or more layers of laminate composite) may extend to the forward and aft edges 232, 234 of the bottom side 222, thereby defining top and bottom flanges 272, 274 extending across portions of such edges 228, 230, 232, 234. As will be described below, the top and bottom flanges 272, 274 may facilitate securing the blade insert 206 between the first and second blade segments 202, 204. The outer layers of the shell(s) (e.g., one or more outer layers of laminate composite and/or one or more layers of core material 42) may then be positioned over the flanges 272, 274 to create a smooth surface along the inner and outer surfaces of the rotor blade assembly 100.

Referring now to FIG. 12, a perspective view of a suitable segment configuration for attaching each blade segment 202, 204 to the blade insert 206 shown in FIGS. 10 and 11 is illustrated in accordance with aspects of the present subject matter. Specifically, FIG. 12 illustrates a perspective view of the joint end 110 of the first blade segment 202. However, it should be appreciated that the joint end 112 of the second blade segment 204 may be configured the same as or similar to the joint end 110 shown in FIG. 12.

As shown, the blade segment 202 may be modified to include scarfed sections 275, 276 configured to be aligned with the scarfed sections 252, 260 of the blade insert 206. Specifically, in the illustrated embodiment, the blade segment 202 includes a top scarfed section 275 defined along the outer surface of its pressure side 30 that is configured to be aligned with top scarfed section 252 defined at the forward edge 228 of the top side 220 of the blade insert 206. Similarly, the blade segment 202 includes a bottom scarfed section 276 defined along the inner surface of its suction side 32 that is configured to be aligned with the bottom scarfed section 260 defined at the forward edge 232 of the bottom side 222 of the blade insert 206. As will be described below, a scarfed connector(s) may be positioned across each aligned pair of scarfed sections 252, 260, 275, 276 to provide a means for securing the blade segment 202 to the blade insert 206.

Additionally, similar to the blade insert 206, the blade segment 202 may include an offset edge(s) 277 at its joint end 110 that is offset from the edge(s) of the opposing side of the blade segment 202 by a given spanwise distance 278. Specifically, in the illustrated embodiment, a portion of the shell forming the pressure side 30 may be removed between the joint end 110 of the blade segment 202 and a front edge of the top scarfed section 275, thereby defining the offset edge 277. As will be described below, this removed portion of the shell may form part of the access window(s) 240, 241 defined between the blade segment 202 and the blade insert 206 when such components are positioned adjacent to one another. Moreover, as shown in FIG. 12, a portion of the shell(s) forming the pressure and suction sides 30, 32 of the blade segment 202 may also be removed, thereby defining upper and lower flanges 279, 280 around the perimeter of the joint end 110 of the blade segment 202.

Referring now to FIGS. 13-15, several assembly views of the blade insert 206 shown in FIGS. 10 and 11 and the blade segment 202 shown in FIG. 12 are illustrated in accordance with aspects of the present subject matter. Specifically, FIG. 13 illustrates a perspective view of the blade insert 206 and the blade segment 202 positioned end-to-end, with suitable components for securing the blade insert 206 to the blade segment 202 being exploded outward. FIG. 14 illustrates a perspective, assembled view of the various components shown in FIG. 13 and FIG. 15 illustrates a cross-sectional view of the assembly shown in FIG. 14 taken about line 15-15.

As shown in FIG. 13, when the blade segment 202 and the blade insert 206 are positioned end-to-end, separate access windows (e.g., a first access window 240 and a second access window 241) may be defined between such components along either side of the elongated portion 247 of the top side 220 of the blade insert 206. Such access windows 240, 241 may generally allow a service worker(s) to access the interior of the rotor blade assembly 100, thereby facilitating the installation of many of the assembly components shown in FIG. 14. For example, similar to the embodiment described above with reference to FIGS. 7-9, a suitable bottom scarfed connector 281 may be positioned across the interface defined between the aligned bottom scarfed sections 260, 276 of the blade insert 206 and the blade segment 202 while suitable bottom shell inserts 282 may be positioned at each interface defined between the bottom flanges 274, 280 of the blade insert 206 and the blade segment 202. In addition, as shown in FIGS. 13 and 15, a shear web insert 283 may be installed within the rotor blade assembly 100 so as to extend spanwise between the ends of the shear webs 48, 246 for the blade segment 202 and the blade insert 206.

After installing such components within the rotor blade assembly 100, suitable window covers 284a, 284b may then installed between the blade insert 206 and the blade segment 206 so as to cover at least a portion of each access window 240, 241. For example, as shown in FIG. 13, a first window cover 284a may be configured to extend across and/or cover at least a portion of the first access window 240. Similarly, a second window cover 284b may be configured to extend across and/or cover at least a portion of the second access window 241. As shown in FIG. 13, the window covers 284a, 284b may generally have similar constructions to that of the shells used to form the blade insert 206 and the blade segment 202. For example, the window covers 284a, 284b may be formed from a layered construction, including one or more layers laminate material and one or more layers of core material 42.

Moreover, as shown in the illustrated embodiment, the rotor blade assembly 100 may also include a top scarfed connector 290 configured to be positioned across the aligned top scarfed sections 252, 275 of the blade insert 206 and the blade segment 202. As shown in FIG. 13, the top scarfed connector 290 may define a tapered profile corresponding to the tapered profiles defined by the top scarfed sections 253, 275. Thus, as particularly shown in FIG. 15, the top scarfed connector 290 may be configured to extend across the interface defined between the blade segment 202 and the blade insert 206 so as to fill the area defined by the aligned top scarfed sections 252, 275.

It should be appreciated that, due to the elongated portion 247 of the top side 220 of the blade insert 206, the blade insert 206 may be configured to abut the blade segment 202 at the location of the top scarfed sections 252, 275 when the blade insert 206 and blade segment 202 are positioned end-to-end (e.g., as shown in FIG. 13). As such, the top scarfed connector 290 may be significantly shorter than the top scarfed connector 190 described above with reference to FIGS. 7-9.

It should also be appreciated that, similar to the embodiments described above with reference to FIGS. 7-9, the bottom scarfed connector 281, the bottom shell inserts 282, and the top scarfed connector 290 may be pre-fabricated components or may be formed or otherwise built up during assembly of the rotor blade assembly 100. Additionally, it should be appreciated that, after the various components of the rotor blade assembly 100 have been assembled between the blade segment 202 and the blade insert 206, an overlaminate 292, which is described in more detail in reference to FIG. 26, may be applied around the outer surface of the rotor blade assembly 100 to ensure a smooth aerodynamic transition between the blade segment 202 and the blade insert 206.

Moreover, it should be appreciated that, although the blade insert 206 was described with reference to FIGS. 13-15 as simply being secured to one of the blade segments (e.g., the first blade segment 202), the same or a similar methodology, as well as the same or similar components, may be used to secure the blade insert 206 to the other blade segment (e.g., the second blade segment 204). For example, a bottom scarfed connector 281, bottom shell inserts 282, a shear web insert 283, a window cover(s) 284a, 284b, and a top scarfed connector 290 may be installed between the aft end 218 of the blade insert 206 and the joint end 112 of the second blade segment 204 to allow such components to be secured to another in the same manner that the blade insert 206 and the first blade segment 202 were secured together (e.g., as shown in FIGS. 13-15).

Further, it should be appreciated that each blade insert 106, 206 described herein may be considered as a blade segment. Thus, one of ordinary skill in the art should appreciate that the disclosed rotor blade assemblies 100, 200 may include one or a plurality of blade inserts 106, 206 with each blade insert forming an individual segment of the rotor blade assembly 100, 200.

Referring now to FIGS. 16-43, various illustrations are provided to further illustrate a window cover (e.g. any of the window covers 184, 284a, 284b described herein) bonded within an access window (e.g. any of the access windows 140, 240, 241 described herein) and a corresponding joint assembly 310 that provides a smooth transition between the blade insert and the blade segments. It should be understood that FIGS. 16-43 generally refer to the blade insert 206 and blade segment 202 illustrated in FIGS. 10-15 for illustrative purposes only. Therefore, the bonding techniques and joint assembly may also be applied to any of the embodiments provided herein.

Referring particularly to FIG. 16, a flow diagram of one embodiment of a method 300 for assembling the rotor blade assembly 200 containing the blade insert 206 and the first blade segment 202 is illustrated. As shown at 302, the method 300 includes securing the forward end 216 of the blade insert 206 adjacent to a first joint end of the first blade segment 202, with at least a portion of the forward edge 228 of the top side 220 being offset relative to the forward edge 232 of the bottom side 222 such that an access window 240, 241 is defined between the blade insert 206 and the first blade segment 202.

As shown at 304, the method 300 includes positioning a window cover (e.g. window cover 284b) so as to cover at least a portion of the access window 241. In certain embodiments, the method 300 may include prepping the window cover 284b before positioning the cover 284b within the access window 241. For example, in one embodiment, as shown in FIGS. 31 and 43, the window cover 284b may be prepped by removing a corner (as indicated by reference number 285) of the cover 284b. In addition, as shown, the window cover 284b may be prepped by removing a portion of core material 286, e.g. adjacent to the removed corner 285 of the window cover 284b and/or a portion of one or more inner skin layers of the window cover 284b adjacent to the removed corner 285. Thus, as shown, the prepped window cover 284b includes a first region 294 with a single-ply thickness (i.e. that includes a single inner skin layer) and a second region 287 with a double-ply thickness (i.e. that includes two inner skin layers) that surrounds the removed corner 285. Such preparations provide the desired ply thicknesses for the base of the joint assembly 310 described generally in FIGS. 28-42. In alternative embodiments, the window cover 284b may be made to include such features during manufacturing such that the window cover 284b is not required to be prepped.

In another embodiment, the method 300 may include forming the flange 272 around the periphery of the access window 240, 241. For example, as shown in FIG. 17, the flanges 272 may be created by machining or grinding away the outer skin layer(s) 268 and/or core material 270 of the blade segment 202 and/or the blade insert 206. FIG. 13 illustrates the completed flanges 272 within each of the access windows 240, 241, respectively. In alternative embodiments, the window cover 284b may be made to include the flange 272 during manufacturing such that the window cover 284b is not required to be machined.

In addition, the method 300 may include prepping one or more of the flanges 272 before positioning the window covers 284a, 284b therein. More specifically, in certain embodiments, as shown in FIGS. 17-21, the method 300 may include prepping a trailing edge flange 271 and a leading edge flange 273 of the access windows 240, 241, respectively. For example, as shown in FIGS. 17-18, the trailing and leading edge flanges 271, 273 may be prepped by removing one or more outer skin layers, a core material, and/or one or more fiber layers from the trailing or leading edges of the rotor blade assembly to create a trailing and leading edge flanges 271, 273 of the access windows 240, 241. Further, as shown in FIGS. 19 and 20, one or more trailing edge inner skin layers 291 and/or inner skin plies 293 may be bonded between the blade insert 206 and the first blade segment 202 at the trailing edge 226. Moreover, the bonded inner skin layers 293 are scarfed to the inner skins adjacent to the bonded inner skin layers 293. Further, as shown in FIG. 21, additional core material 295 may be placed atop the one or more inner skin layers 291, 293 so as to complete the trailing edge flange 271. In addition, as shown in FIG. 21, the leading edge flange 273 of the access window 241 may be prepped by forming a bond cap scarf connection 296 at the leading edge 224 of the rotor blade assembly 200 between the blade insert 206 and the first blade segment 202.

In additional embodiments, the step of prepping the window covers 240, 241 may include tapering at least one end of the window covers 284a, 284b. For example, as shown in FIGS. 23 and 24, cross-sectional views of the window cover 284b are illustrated. More specifically, FIG. 23 illustrates the window cover 284b from the cover to the spar cap 242, whereas FIG. 24 illustrates the window cover 284b from the cover to the existing skin of the blade segment 202. Thus, as shown, the window cover 284b includes a first end 296 and a second end 297, with at least one of the first or second ends 296, 297 having a tapered cross-section. For example, as shown in FIG. 23, the tapered cross-section of the first end 296 may have a thickness that increases towards the spar cap 242 of the rotor blade assembly 200. Further, as shown in FIG. 24, the tapered cross-section of the second end 297 may have a thickness that decreases towards the trailing edge 226 of the rotor blade assembly 200. Moreover, the leading edge 224 may have a thickness that decreases towards at least one of the blade root 24 or the blade tip 26 of the rotor blade 22. In addition, as shown, the window cover 284b may be sized such that a peripheral gap 303 exists between a perimeter of the window cover 284b and the access window 241 when the window cover 284b is positioned therein. Thus, the undersized window cover 284b provides a desired bond gap and squeeze out for the bonding agent 298. Accordingly, the tapered cross-section of the window cover 284b supports a more consistent bond gap thickness across the joint (i.e. considering expected inner skin layer deflection). Further, the tapered cross-section(s) allow for alignment of the core material between the window cover 284b and the existing blade to avoid additional sanding or machining.

Referring back to FIG. 16, as shown at 306, the method 300 includes bonding, via a bonding agent, the window covers 284a, 284b within the access windows 240, 241. As shown in FIG. 27 and referring particularly to the leading edge window cover 284b, simply bonding the window cover 284b to the flange 272 of the access window 241 creates an undesirable bump out 301 at the leading edge 224 due to the joint having two sets of inner skin layers (i.e. the leading edge inner skin layers 305 of the assembly 200 and the inner skin layers 307 of the window cover 284b) as well as the bond thickness 265 between the two sets of inner skin layers 305, 307. In addition, as shown at location 299, due to the mismatching outer surface, one or more undesirable stress concentrations may exist due to the multiple sets of inner skins. Thus, the method 300 includes forming a joint assembly 310 at one or more of the flanges 272 of the access windows 240, 241, e.g. as shown in FIG. 25. In such embodiments, the joint assembly(ies) 310 are located at an interface between the window cover 284b and the access window 241 at the leading edge 224 of the rotor blade assembly 200. Accordingly, as shown in FIG. 28, the joint assembly 310 eliminates the undesirable bump 301 and the leading edge 224 of the rotor blade assembly 200 and the stress concentrations from the overlapping skin layers by transitioning the two sets of inner skin layers to a single set of inner skin layers.

More specifically, as shown in FIGS. 29-42, the various steps associated with forming the joint assembly 310 at the flange 272 of the access window 241 are illustrated. For example, as shown in FIG. 29, a partial top view of a portion of the flange 272 of the access window 241 is illustrated. More specifically, as shown, the majority of the flange 272 has a double-ply thickness (also referred to herein as a double-ply area); however, a corner 308 of the flange 272 has been machined to have only a single-ply-thickness (also referred to herein as a single-ply area). In certain embodiments, to achieve this single-ply thickness, the method 100 may include removing at least one inner skin layer of the flange 272 adjacent to the leading edge 224 of the rotor blade assembly 200. Thus, as shown in FIG. 30, the method 300 may include placing a layer of the bonding agent 298 or bond paste atop at least a portion of the flange 272 of the access window 241. Referring now to FIGS. 31 and 32, the method 300 further includes placing an edge of the window cover 284b atop of the layer of the bonding agent 298. Further, as shown, additional bonding agent 298 is added to fill the inner skin transition zone to prepare for the first fiber layer 312. More specifically, as mentioned, the edge of the window cover 284b may have a first region 294 having a single-ply thickness and a second region 287 having a double-ply thickness adjacent to a removed corner 285, which allows for the transition of two sets of inner skin layers to one set of inner skin layers while also allowing for the appropriate skin connections between the blade segment 202 and the blade insert 206. Thus, in such embodiments, the step of positioning the window cover 284b in the access window 241 may include placing the removed corner 285 of the window cover 284b adjacent to the flange 272 of the access window 241 where at least one inner skin layer was removed (indicated by 308). It should be understood that such regions 287, 294 may be prefabricated into the window cover 284b or may be machined into said cover 284b after initial manufacturing.

Thus, as shown in FIG. 33, the method 100 may further include placing a first fiber layer 312 across the flange 272 of the access window 241 and the first region 294 of the window cover 284b. Accordingly, the joint assembly 310 maintains an equal ply thickness above the bond paste 298. Referring now to FIG. 34, the method 100 may further include placing a second fiber layer 314 atop, at least, the first fiber layer 312 and the second region 287 of the window cover 284b. For example, as shown, the second fiber layer 314 may have a shape designed to fit atop the first fiber layer 312, the second region 287 of the window cover 284b, as well as the inner skin layers of the blade segment 202 at the leading edge 224. It should be understood that the first and second fiber layers 312, 314 may be constructed of any suitable fibers having any suitable fiber direction, such as, e.g. unidirectional, biaxial, or multi-axial fibers.

Referring now to FIG. 35, the method 10 of forming the joint assembly 310 further includes placing core material 316 atop a portion of the second fiber layer 314, leaving a portion of the second fiber layer 314 exposed. Thus, referring back to FIGS. 26 and 28 and as further illustrated in FIG. 36, once the joint assembly(ies) 310 are formed, the final rotor blade assembly 200 can be covered with one or more outer skins 320.

Referring now to FIGS. 37-42, another embodiment of forming the joint assembly 310 according to the present disclosure is illustrated, which is a variation to the embodiment provided in FIGS. 29-36. More specifically, as shown in FIG. 37, additional foam 270 is removed adjacent to an edge of the blade segment 202. Such removal allows for the connection of the first fiber layer 312 in a different way. For example, as shown in FIG. 38, bond paste 298 can be laid in the area where the foam 270 has been removed to provide a larger area for the first fiber layer 312, e.g. as shown in FIG. 39. More specifically, as shown, the first fiber layer 312 is larger than the embodiment of FIGS. 37-42. As shown in FIG. 40, the second fiber layer 314 may be placed atop the first fiber layer 312. More specifically, as shown, the second fiber layer 314 may also have a different geometry than the previous embodiment of FIGS. 37-42. As shown in FIG. 41, core material 316 may be placed atop the second fiber layer 314. Thus, as shown in FIG. 42, the outer skin layers 320 may be. Such embodiments are provided to illustrate how variations can be made to the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor blade assembly having a blade insert and a first blade segment, the blade insert including a top side extending between a forward edge and an aft edge and a bottom side extending between a forward edge and an aft edge, the method comprising:
   securing a forward end of the blade insert adjacent to a first joint end of the first blade segment, at least a portion of the forward edge of the top side being offset relative to the forward edge of the bottom side such that an access window is defined between the blade insert and the first blade segment;
   positioning a window cover so as to cover at least a portion of the access window;
   sizing the window cover such that a peripheral gap exists between a perimeter of the window cover and the access window when the window cover is positioned in the access window: and
   bonding, via a bonding agent, the window cover within the access window, wherein the bonding agent fills the peripheral gap between the perimeter of the window cover and the access window.

2. The method of claim 1, further comprising forming one or more flanges around a periphery of the access window and prepping the one or more flanges before positioning the window cover.

3. The method of claim 2, wherein prepping the one or more flanges before positioning the window cover so as to cover at least a portion of the access window further comprises prepping a trailing edge flange of the access window by:
   removing at least one of an outer skin layer, a core material, or a fiber layer from a trailing edge of the first blade segment to create a trailing edge flange of the access window;
   bonding one or more inner skin layers between the blade insert and the first blade segment;
   scarfing the one or more inner skin layers to inner skins adjacent to the bonded one or more inner skin layers; and,
   placing a core material atop the one or more inner skin layers so as to complete the trailing edge flange.

4. The method of claim 2, wherein prepping the one or more flanges before positioning the window cover so as to cover at least a portion of the access window further comprises prepping a leading edge flange of the access window by:
   forming a bond cap scarf connection at a leading edge of the rotor blade assembly between the blade insert and the first blade segment.

5. The method of claim 2, further comprising forming a joint assembly at one or more of the flanges of the access window.

6. The method of claim 5, wherein forming the joint assembly at one or more of the flanges of the access window further comprises:
   placing a layer of the bonding agent atop a portion of a flange of the access window;
   placing an edge of the cover atop of the layer of the bonding agent, the edge of the window cover having a first region with a single-ply thickness and a second region with a double-ply thickness;
   placing a first fiber layer across the flange of the access window and the first region of the window cover;
   placing a second fiber layer atop, at least, the first fiber layer and the second region; and,
   placing core material atop a portion of the second fiber layer, leaving a portion of the second fiber layer exposed.

7. The method of claim 6, further comprising placing the second fiber layer atop the first fiber layer and the second region and another portion of one of the flanges of the access window.

8. The method of claim 6, further comprising prepping the window cover before positioning the window cover so as to cover at least a portion of the access window.

9. The method of claim 8, wherein prepping the window cover further comprises tapering at least one end of the window cover.

10. The method of claim 9, wherein positioning the window cover so as to cover at least a portion of the access window further comprises placing the removed corner of the window cover adjacent to the flange of the access window where at least one inner skin layer was removed.

11. The method of claim 8, wherein prepping the window cover further comprises:
   removing a corner of the window cover;
   removing a portion of core material adjacent the removed corner of the window cover so as to form the second region with the double-ply thickness; and,
   removing a portion of one or more inner skin layers of the window cover adjacent to the removed corner so as to form the first region with the single-ply thickness.

12. The method of claim 11, further comprising removing at least one inner skin layer of the flange adjacent to a leading edge of the rotor blade assembly.

13. A rotor blade assembly for a wind turbine, the rotor blade assembly comprising:
   a first blade segment defining a first joint end;
   a second blade segment defining a second joint end;
   a blade insert extending between a forward end coupled to the first blade segment and an aft end coupled to the second blade segment, the blade insert comprising:
   a top side extending between a forward edge and an aft edge, the top side defining a top scarfed section at its forward edge; and,
   a bottom side extending between a forward edge and an aft edge, the bottom side defining a bottom scarfed section at its forward edge,
   wherein at least a portion of the forward edge of the top side is offset relative to the forward edge of the bottom side such that an access window is defined between the top side and the first blade segment when the forward end of the blade insert is positioned adjacent to the first joint end of the first blade segment, the access window comprising a flange that extends around a periphery thereof; and, a window cover bonded to the flange of the access window via a bonding agent, the window cover being sized such that a peripheral gap exists between a perimeter of the window cover and the access window, the peripheral gap being filled with the bonding agent.

14. The rotor blade assembly of claim 13, wherein the joint assembly is located at a leading edge of the rotor blade assembly.

15. The rotor blade assembly of claim 14, wherein the window cover at the interface further comprises a removed corner adjacent to the flange of the first blade segment, and wherein the flange of the access window at the interface comprises a double-ply area and a single-ply area, at least a portion of the double-ply area containing a bonding agent, the removed corner of the window cover exposing the single-ply area of the flange.

16. The rotor blade assembly of claim 15, wherein the joint assembly further comprises:
 a first fiber layer positioned atop the flange of the access window and the first region having the single-ply thickness of the window cover;
 a second fiber layer positioned atop, at least, the first fiber layer and the second region having the double-ply thickness; and,
 a core material positioned atop a portion of the second fiber layer, leaving a portion of the second fiber layer exposed.

17. The rotor blade assembly of claim 13, wherein the window cover comprises a first end and a second end, at least one of the first or second ends comprising a tapered cross-section.

18. A rotor blade assembly for a wind turbine, the rotor blade assembly comprising:
 a first blade segment;
 a second blade segment arranged with the first blade segment at a joint,
 an access window defined within at least one of the first blade segment or the second blade segment, the access window comprising a flange that extends around a periphery thereof;
 a window cover bonded to the flange of the access window via a bonding agent; and,
 at least one joint assembly at an interface between the window cover and the access window, the joint assembly comprising a transition from two sets of inner skin layers to one set of inner skin layers, wherein, at the interface, the window cover comprises a first region having a single-ply thickness and a second region having a double-ply thickness.

19. The rotor blade assembly of claim 18, wherein the tapered cross-section of one of the first end or the second end comprises a thickness that decreases towards at least one of a leading edge or a trailing edge of the rotor blade assembly, and wherein the tapered cross-section of another one of the first end or the second end comprises a thickness that increases towards a spar cap of the rotor blade assembly.

* * * * *